(12) United States Patent
Myers et al.

(10) Patent No.: US 11,668,656 B1
(45) Date of Patent: Jun. 6, 2023

(54) AUTOMATED INSPECTION MEASUREMENT IN GARMENT MANUFACTURING

(71) Applicant: CreateMe Technologies LLC, New York, NY (US)

(72) Inventors: Thomas C. K. Myers, New York, NY (US); Rambod Nader, Oakland, CA (US)

( * ) Notice: Subject to any disclaimer, the term of this patent is extended or adjusted under 35 U.S.C. 154(b) by 0 days.

(21) Appl. No.: 17/988,632

(22) Filed: Nov. 16, 2022

Related U.S. Application Data

(63) Continuation of application No. 17/566,490, filed on Dec. 30, 2021.

(51) Int. Cl.
  *G01N 21/89* (2006.01)
  *G01N 21/88* (2006.01)
  *G01N 21/898* (2006.01)

(52) U.S. Cl.
  CPC ..... *G01N 21/8983* (2013.01); *G01N 21/8851* (2013.01); *G01N 2021/888* (2013.01)

(58) Field of Classification Search
  CPC ........... G01N 21/8983; G01N 21/8851; G01N 2021/888
  See application file for complete search history.

(56) References Cited

U.S. PATENT DOCUMENTS

2019/0129396 A1\* 5/2019 Valkonen ......... G05B 19/41875

\* cited by examiner

*Primary Examiner* — Jamil Ahmed

(57) ABSTRACT

A system for inspecting and validating processes performed on a continuous web of fabric in an automated apparel manufacturing environment. The continuous web of fabric can move in a step wise fashion across a work area where tooling can perform one or more processes on the continuous web of fabric. At least one projector is provided to display an image onto the continuous web of fabric the image including a first image related to an article to be manufactured and a second image related to a reference grid. The continuous web of fabric and the first and second images are viewed by a camera, and data related to the viewed first and second images and the continuous web of fabric can be sent to a computer implemented control center which can analyze the data to determine whether a deviation or error exists regarding the manufacturing process.

27 Claims, 18 Drawing Sheets

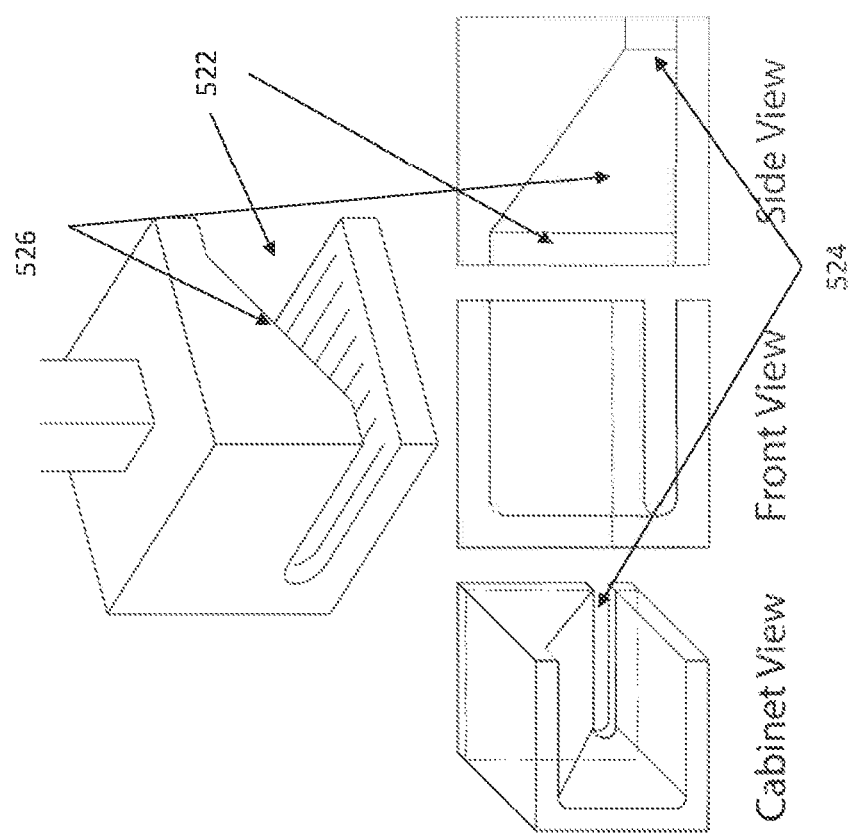

AUTOMATED INSPECTION MEASUREMENT IN GARMENT MANUFACTURING

RELATED APPLICATION

This application is a continuation application of U.S. application Ser. No. 17/566,490, Filed Dec. 30, 2021, the entire contents of which are incorporated herein by reference.

FIELD OF THE INVENTION

The present invention relates to systems and methods for automated fabrication of garments and similar articles, and more particularly to a system for optically confirming manufacturing parameters.

BACKGROUND

Despite technological advances and introduction of automation in many types of manufacturing, garment manufacturing remains very labor intensive. Sewing machines were invented in the early nineteenth century and were made possible based on the development of the lock stitch sewing technique. Today, some hundred fifty years later, this same technology remains the foundation of garment manufacturing. The modem process of producing large quantities of ready-to-wear apparels relies heavily on manual labor and relative to other industrial manufacturing it remains inefficient. Garment manufacturing includes multiple steps including sizing, folding, fitting, cutting, sewing, material handling. The type of tasks needed dictates the level of skilled labor that is required to perform the work. The unique and varied properties of fabric such as weight, thickness, strength, stretchiness and draping as well as the complicated nature of tasks required in apparel manufacturing renders material handling and automated garment manufacturing a great challenge.

The garment manufacturing process starts with cutting one or more layers of fabric based on patterns and dimensions matching the desired garment style. Then, the cut fabric patterns (panels) are transferred from workstation to workstation, where at each workstation, one, two or more pieces of fabrics are manually folded, overlapped along the seams and fed into a sewing or serger (overlocker) machine. Given the variety of fabrics, threads, seam types and stitch types found in a finished garment, a larger number of workstations with specialized tools and skilled operators is required for assembling a garment. This means the fabrics or unfinished garments spend a lot of time in transit between workstations. Unlike many manufacturing industries benefiting from twenty-first century innovations and advances in material handling in most small and large apparel manufacturing factories, many of the material handling and apparel manufacturing operations are conducted in a manual or semi-manual manner.

Currently, despite advances in technology, machines still struggle to perform certain tasks that are easily handled by even an untrained worker with average hand-eye coordination skills. This is one reason the garment manufacturing industry is in a constant search of lower cost labor rather than investing in advanced automated manufacturing systems. So, in many cases, the difference between small and large garment manufacturing operations is the number of workers it engages. To increase production, a factory may add additional production lines in parallel. However, in general, increasing production in this manner does little to improve efficiency. Even in large factories, most work is performed in piecemeal fashion, with limited coordination between various stations/steps, and movement of material between each station requires a great deal of manual product handling. Therefore, the entire garment manufacturing process remains labor intensive and inefficient, where work is performed in a discontinuous batch processing fashion, causing apparel manufacturers to move from country to country in a continuous search for lower labor costs for manual and semi-skilled labor.

Most of the innovations in the garment manufacturing industry have been directed to improving individual tools. For example, new features may be added to a sewing machine to convert it from manual to a semi-automatic or automatic tool. However, all material handling needs would still require manual manipulation, including loading, unloading piecemeal work in and off the tool.

Few garment manufacturing innovations attempt to address the inefficiencies of the apparel manufacturing process at the system level. Continuous methods and systems have been proposed but all include limitations that have prohibited mass implementation of the system. Previous proposals for various continuous manufacturing processes of apparel have limitations that render them undesirable or impractical including undesirable shape, fit and design of garments, difficult or impractical requirements for accurate registration or synchronization of various moving components, and impossibles.

Another constraint in today's garment manufacturing is the inability to efficiently produce in small batches or mass produce customized garments tailored to every consumer's body shape and measurements. Manufactures rely on economies of scale and require minimum order quantity which may be out of reach for small brands and designers. Given the heavily manual and piecemeal processes in the current manufacturing operations, small batches or mass customized production that requires constantly shifting product designs, material selections and sizing and sewing techniques result in production difficulties and resulting manufacturing errors and resulting lower yields. To satisfy the growing need in fulfilling small batch or mass customized orders, garment manufacturing systems that are highly automated, programmable, and reconfigurable to accommodate an increasing mix of design, material selection, sizing and joining techniques are desired.

SUMMARY

The disclosed embodiments provide a system for manufacturing apparel. The system includes a structure for dispensing a continuous web of fabric across a workstation, and tooling for performing one or more processes on the continuous web of fabric. The system further includes at least one projector for projecting at least one image onto the continuous web of fabric and at least one camera configured to view at least a portion of the continuous web of fabric. The system also includes a control system that is functional to receive manufacturing data and deliver manufacturing instructions to tooling. The control system is also functional to deliver projection data to the camera including data for projecting onto the continuous web of fabric an image related to an article of manufacture and an image related to a reference grid. The control system can receive data from the camera regarding the projected images and the continuous web of fabric and can analyze the data to determine a deviation error related to the one or more processes to be performed on the continuous web of fabric.

In one embodiment, the continuous web of fabric can be suspended between a dispensing roll of fabric and a retrieving roll. In another embodiment, the continuous web of fabric can be supported by a surface such as a conveyor belt or table.

In one embodiment, the system can include a plurality of projectors, and in such an embodiment one projector can be used to project the image related to the article of manufacture and another projector can be used to project a reference grid. In one embodiment, the system can include a plurality of cameras which can view the continuous web of fabric from various angles.

In one embodiment, the continuous web of fabric can be one or more of cloth, upholstery, leather or felt. In one embodiment, the control system can be functional to analyze data from the at least one camera to detect a deformation of the continuous web of fabric by comparing the fabric with the projected grid. In one embodiment, the control system can be functional to determine a deviation in the process to be performed on the continuous web of fabric by comparing the projection related to the article of manufacture with the projection of the grid from the data received from the at least one camera. In another embodiment, the control system can be functional to verify accurate placement of an item on a finished article of manufacture by comparing a view of the item with the projection of the grid from the data received by the at least one camera.

These and other features and advantages will be apparent to one of skill in the art upon reading of the following detailed description of the embodiments in conjunction with the figures. In the figures, like reference numerals used in more than one figure indicate a like element and may be considered in light of the description of the like element presented in any of the other figures having the like element.

BRIEF DESCRIPTION OF THE DRAWINGS

For a fuller understanding of the nature and advantages of this invention, as well as the preferred mode of use, reference should be made to the following detailed description read in conjunction with the accompanying drawings. The drawings are not presented to scale unless specified otherwise on an individual basis.

FIGS. 5 and 5A illustrate exemplary systems for cutting, folding and seam formation according to some exemplary embodiments.

DETAILED DESCRIPTION

Figure 1:
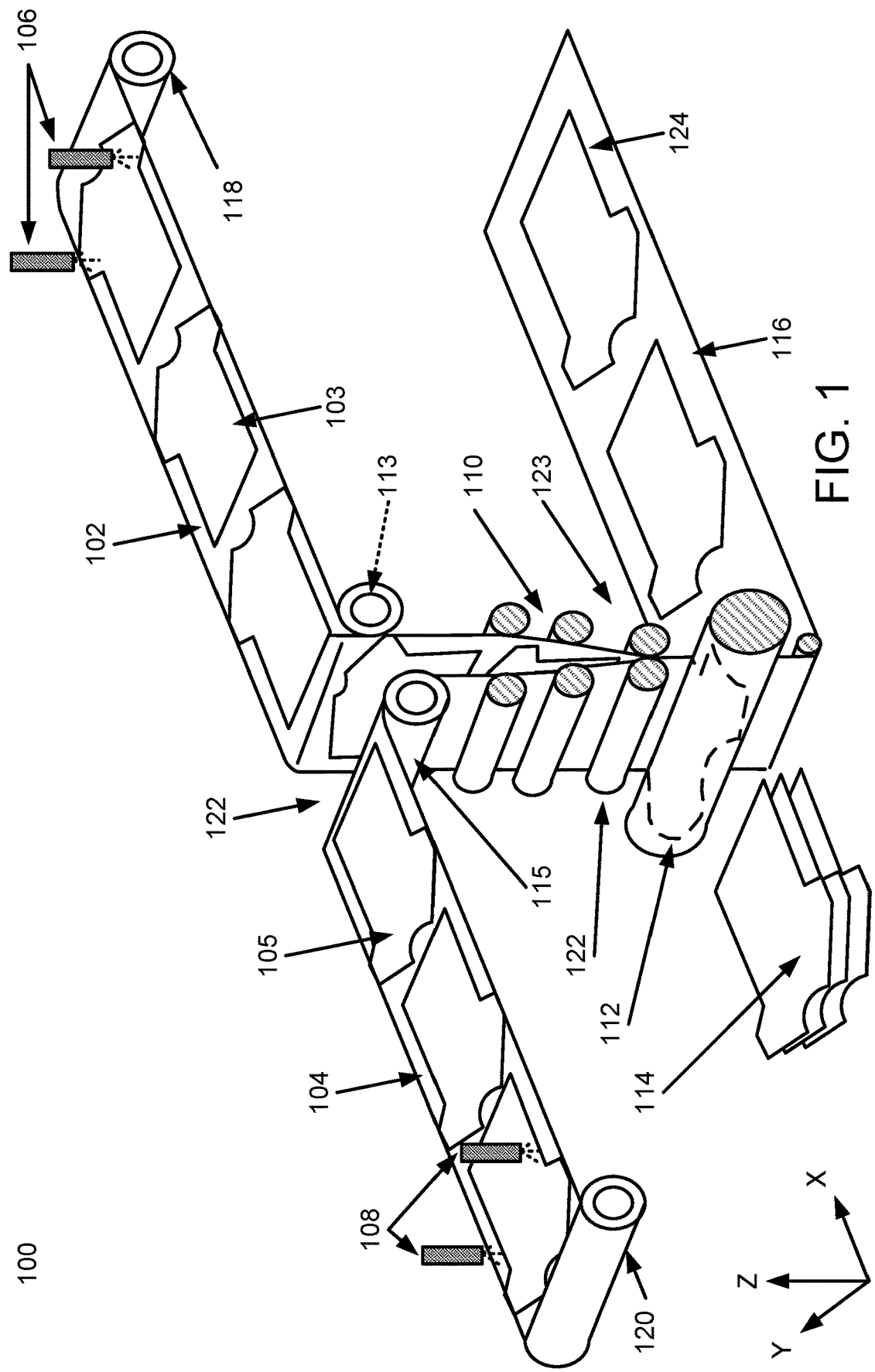
FIG. 1 shows an automatic garment manufacturing system according to some exemplary embodiments.

The following description includes the best embodiments presently contemplated for carrying out the invention. This description is made for the purpose of illustrating the general principles of this invention and is not meant to limit the inventive concepts claimed herein in any way.

Some embodiments based on the present disclosure provide for systems and methods for transferring and manipulating fabrics and joining garment components during garment manufacturing in a way that is more suitable to automation. Some embodiments provide for garment manufacturing systems and methods that are reconfigurable to enable both mass production of customized garments and small batch processing with reduced human intervention.

As previously mentioned, traditional methods of making a garment require converting various measurements of body parts into two dimensional layouts (panels) corresponding to the various garment pieces or sections, cutting garment pieces out of webs (aka looms) of fabric, and using a variety of manual or semi-manual operations requiring a great deal of hand-eye coordination and manipulation and fine motor skills of experienced seamstresses to assemble and join together the various pieces of fabric to make a garment. This heavy reliance on manual processes is inefficient when compared to most modern manufacturing systems and processes. Additionally, reliance on manual labor, especially labor with specialized skills is expensive, and inherently more prone to errors depending on the required skill, resulting in products with lower yields due to higher defects, more rejections and increased waste and costs. Simply put, the current garment manufacturing process remains heavily reliant on antiquated systems and processes carried over from the industrial revolution from the beginning of the 19th century. Therefore, it would be highly desirable to create systems and processes for garment manufacturing that lend themselves to significantly reduced reliance on manual product manipulation and handling, promote continuous garment manufacturing methods over piecemeal processing, and offer flexible systems that can mass produce items while allowing for customized production.

Embodiments based on the present disclosure cover processes that combine an adhesive to effect the permanent bonding of a variety of types of fabric, with a series of integrated mechanical processes to eliminate or greatly reduce material handling issues and the human intervention traditionally required in the garment manufacturing process. This will increase the speed and efficiency of the processes, improve the overall quality of the finished garments and provide for flexible systems that can mass produce items while allowing for customized production, whereby production items can be adjusted to individual size and style. Exemplary embodiments provide for seam formation, joinder and cutting tools that are adaptable and programmable such as to allow automated and customizable garment manufacturing systems and processes.

Exemplary embodiments will be described with reference to the manufacture of T-shirts. However, it would be understood that these described exemplary embodiments may be easily adapted to produce other types of garments including long sleeve shirts, dress shirts, jackets, pants, gloves, or non-garment products such as bedsheets, pillow cases, table cloths, rugs or handbags, etc. Therefore, the exemplary embodiments of this disclosure should not be interpreted as limiting the scope of the present disclosure.

Turning now to the drawings, FIG. 1 illustrates an automatic garment manufacturing system according to some exemplary embodiments. The automated garment manufacturing system 100 of FIG. 1 is designed to eliminate or reduce manual labor. As shown in FIG. 1, system 100 includes a first web 102 including the back half 103 of a garment 114 (a T-shirt in the current example) corresponding to a given design and size. A second web of fabric 104 includes the front half 105 of the T-shirt 114.

In some embodiments, each web may comprise a continuous layer of fabric laid out in two dimensions that may be unrolled from a loom or roll of fabric. In some embodiments, one or more of the webs may include shapes other than a flat sheet, including any three-dimensional shape such as a tube or other shapes. In some embodiments, the web may not include a continuous sheet of fabric. In some embodiments, the web may act as a scaffolding (not shown in the drawing) or carrier for fabric components that are secured to the web by some means and are acted on as the web travels through paths. In some embodiments one or more webs may include perforations along one or more borders. In some embodiments, one or more webs may be coupled to a scaffolding (not shown in the drawing) that includes perforations along one or more borders. In some embodiments, one or more fabric webs (e.g. webs 102 and 104) may include perforated borders made of the same material as the web and integral to the web or made of the same or different material than the web and is attached to the one or more fabric web. In some embodiments, the border perforations of the web or the scaffolding may be used to pull the web along a given path pulled along by a system of one or more gears, providing control of the movement of the web, synchronize the movement of the web to other moving components of the exemplary manufacturing system. In exemplary embodiments, the sheet of fabric 102 is dispensed from a fabric roll 118 that is operable to rotate about its axis and dispense the web 102 along the X-axis. Similarly, web 104 is dispensed from a fabric roll 120 that is capable of rotating about its axis and dispensing the web 104 along the X-axis. In some embodiments, roll 118 and/or roll 120 are coupled to one or more actuators, gears, motors (continuous or step) that rotate at a selected speed pulling or pushing the web along the X-axis. In some embodiments, rolls 118 and 120 are free to move but are not mounted on motorized shafts. In these exemplary embodiments, the webs 102 and 104 may be pulled by one or more actuators or motors located at suitable locations other than roll 118 or 120 rolls. In some embodiments, actuators or motors are located at rollers 113 and 115, rollers 122 and 123, rotary die roller 112, and/or other suitable locations, providing pull or push forces acting on the webs 102 and 104. In some embodiments, one or more rollers include actuating means that are operable to being actuated independently and activated in a way to distribute the application of the pull or push forces along the webs 102 and 104 to reduce the chances of damaging the fabric by overly stressing, straining or even tearing fabric web at one or more locations. In alternative embodiments, the webs 102 and 104 may have borders made of the same or different material, that may be perforated or include a greater friction coefficient, and where the border material is reinforced or inherently has greater tensile strength and provides for an area that may support and tolerate greater stress or strain forces than the fabric web materials can tolerate without affecting the quality of the fabric webs.

In some embodiments, the front half contour 105 and/or back half contour 103 of the T-shirt 114 include markings to further define the T-shirt 114's borders on the corresponding webs 102 and 104. In exemplary embodiments, the front half and back half contours 105 and 103 of the T-shirt 114 may be temporarily marked by visible, invisible, or washable ink. In other embodiments, no demarcation may be used to identify the contours of front half 103 or back half 105 of T-shirt 114. In some embodiments, the outer face of the back half 103 and front half 105 of the T-shirt 114 may be facing out as shown in FIG. 1. In some embodiments, back half 103 and front half 105 are arranged inside-out, so that the interior face of each half of T-shirt 114 would be facing out.

In exemplary embodiments, adhesive dispensers 106 and 108 dispense adhesive along the contours of the back half 103 and/or front half 105 of the T-shirt 114, except may be in the neckline region, sleeve opening and bottom opening of the T-shirt 114. The regions with no adhesive may remain open and form the neck, arms and body holes after the final cutting and finishing steps further described below.

In exemplary embodiments, after the deposition of the adhesive, the web 102 and the web 104 continue to travel along the X axis toward a joinder point where webs 102 and web 104 are pressed together using one or more rollers (e.g. rollers 110, 122 and 123). In some embodiments, beyond the joinder point, the web 102 and web 104 are pressed together using a predetermined force, heat, radiation or moisture to activate any adhesive applied to the back half 103 and front half 105 of T-shirt 114, and affix the back half 103 and front half 105 of T-shirt 114 to form an integral complete garment. In some embodiments, in addition to pressure, heat, radiation or moisture are applied to web 102 and web 104. In some embodiments, the rollers 110, 122 and 123 supply pressure, heat, radiation, or moisture uniformly to the web 102 and web 104. In some embodiments, pressure, heat, radiation, or moisture may be applied only to certain regions of the back half 103 and front half 105 contours that have applied adhesive. In some embodiments, the pressure, heat, radiation, or moisture may not be applied through the rollers. In some embodiments, some or all the pressure, heat, radiation, or moisture may originate from sources other than the rollers 110, 122 and 123. In some embodiments, heat and radiation may be applied by conduction, radiation, or convection. In some embodiments, energy sources such as lasers, heat guns, or hot plates may supply the energy.

It should be apparent that synchronization of the movements of web 102 and web 104 are important. In some embodiments, mechanical means such as belts, chains, gears and sprockets are used to actuate the movement of web 102 and 104 in sync. In some embodiments, electronic controls along with variable speed motors and/or step motors may be used to control the movement and speed of webs 102 and 104 in order to maintain web 102 and web 104's movement in synch and provide for the accurate registration and alignment of the back half 103 to the front half 105 of T-shirt 114. In some embodiments one or more webs may include perforations along one or more borders to be operable similar to a chain and sprocket conveyance mechanism operating on one or more webs 102 and 104, or any other webs (not shown in FIG. 1). In some embodiments, one or more webs may be coupled to a scaffolding (not shown in the drawing) that includes perforations along one or more borders. In some embodiments, the border perforations of the web or the scaffolding may be the mechanism that receive the conveyance forces propelling the web along its path, control the movement of the web, and synchronize the movement of the web to other moving components of the exemplary manufacturing system. Exemplary embodiments of this disclosure require the synchronization of fewer number of moving parts and allows for a more accurate control of the movement of any web, thus providing for exemplary systems and methods according to the present disclosure that are more easily implementable, resulting in improved production quality, fewer defects, a higher production yield and lower material and manufacturing costs.

With reference to FIG. 1, after one or more rollers 110, 122 and 123 join the back half 103 and front half 105 of T-shirt 114 together, the two halves of T-shirt 114 are permanently pressed together to form T-shirt 114. In some embodiments, multiple rollers 122 and 123 operate on the webs 102 and 104 to join them together at the contours of T-shirt 114. In some embodiments, the rotary die 112 may further cut T-shirt 114 along its borders and out of the joined webs 102-104. In some embodiments, the rotary dies may cut the garment outside of the adhesive bondline, at the edge of the bondline or along an area within the bondline. The bondline refers to the regions on each ply of the fabric that are designated to be joined to other fabric layers to form parts of a garment or any other object being fabricated. In some embodiments, the rotary dies may apply heat energy simultaneously with or after the cutting operation to melt or remelt the adhesive, the fabric or both to produce finished seams that are aesthetically more desirable, physically durable (prevent fraying) or both. In some embodiments, programmable and controllable cutters may be used to cut out the formed garment (T-shirt 114) from the joined webs. In some embodiments, programmable and controllable cutters traveling along predetermined cutting paths may be used to detach the formed garment from the joined webs. In some embodiments, cutters may be directed or aided by machine vision and supporting artificial intelligence (AI) used to identify the actual bondline and cut along it or at an offset from the bondline. In some embodiments, the rollers 122 and 123 may be equipped with pressure sensing elements to detect any bulging that may correspond to where bondlines are located and seams are formed, and communicating the sensor readout in real-time to the programmable cutters for more accurate positioning and cutting operation. In some embodiments, T-shirt 114 may be cut to be completely free of the web 102-104 combination. In some embodiments, fully or partially cutout T-shirt 114 may continue to travel on the web 124 to the next processing station. In some embodiments, instead of cutting, the garment 114's borders are perforated by needles that may result in garment 114 that may remain partially attached to the joined webs 102-104, for further processing to allow for easier handling of the garment 114 during processing. The garment 114 with perforated perimeter may be fully detached from the web during a cutting or stamping operation, at which point garment 114 is fully detached from the joint web 110-104. In some embodiments, the detached T-shirts 114 are separated from the web 102-104 and collected for further processing at subsequent operating stations where the T-shirt 114 may be processed to receive a collar, hemming of the sleeves, adding pockets, zippers, embroidery and packaging. In some embodiments the joined web 102-104 leftover material 116 may accumulate on a roller for ultimate disposal. In some embodiments, the leftover 116 of the joined 102-104 is further processed to form components used for forming liners, pockets, seams, hemlines, necklines or sleeve openings as described further below.

In some embodiments, T-shirts 114 remain fully or partially attached to the web 102-104 to continue to travel as part of the web 102-104 for easier material handling during additional processing. In some embodiments, additional processing may include customization operation of garment 114 including embroidery, DTG (direct-to-garment) printing, screen printing, etc. In some embodiments, after all processing is completed, T-shirts 114 are cut out of the web 102-104 and processed for final packaging.

Figure 2:
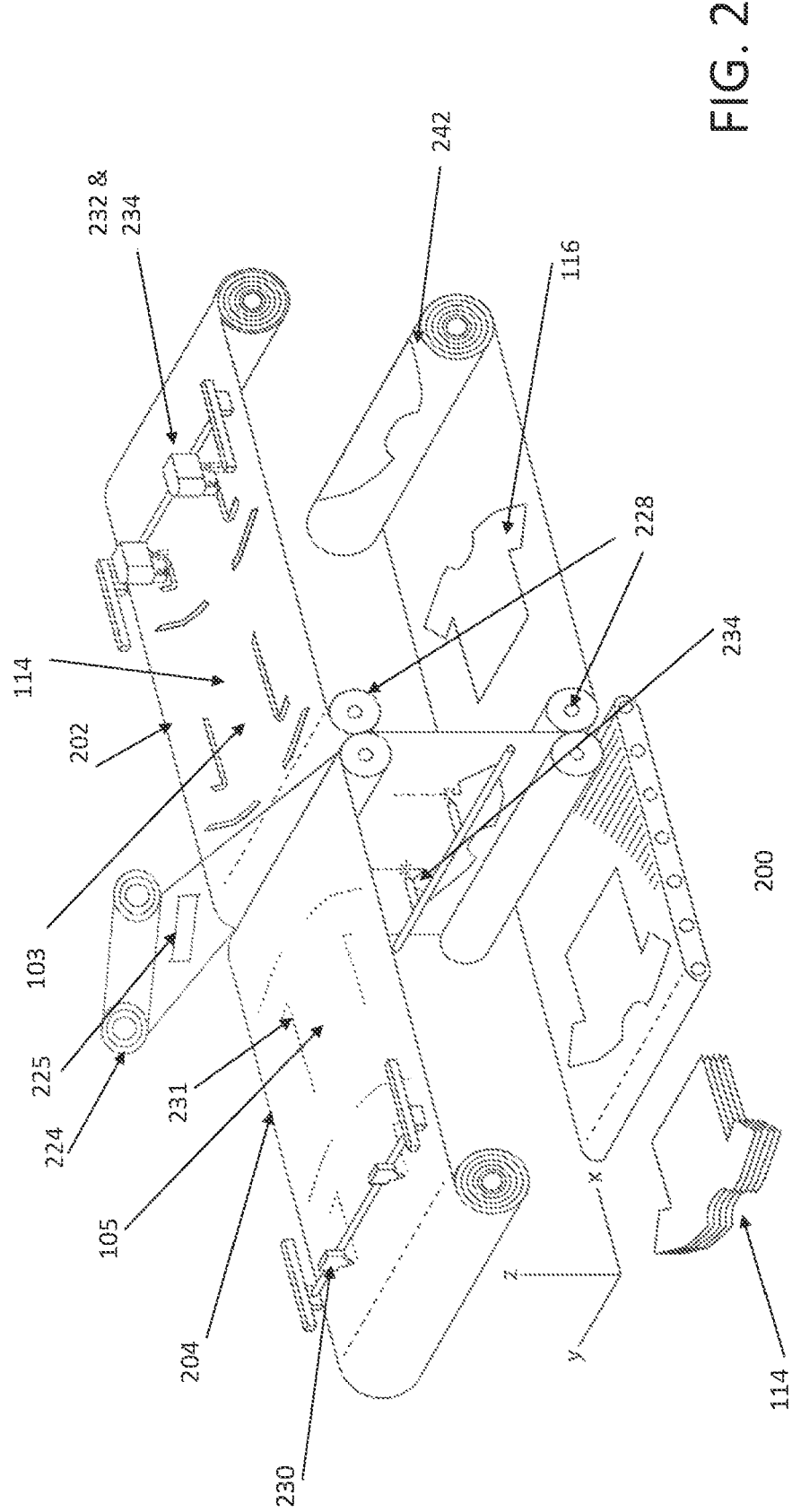
FIG. 2 illustrates a simplified depiction of the webs of fabric according to some exemplary embodiments.

FIG. 2 illustrates another automatic garment manufacturing system according to some exemplary embodiments. System 200 includes a first web 202, a second web 204, one or more rollers as represented by roller 228, one or more adhesive dispensing devices 230, folding devices 232, cutting devices 234 and optional additional fabric depositing devices represented by web 224. In exemplary embodiments, fabric depositing device 224 may deposit a strip of fabric at the hemline of back half 103 and front half 105 of T-shirt 114 to form a hemline seam. In some embodiments, adhesive 231 is deposited along the bottom perimeter of back half 105, front half 103 or both front half 105 and back half 103 prior to the fabric deposition by device 224. Therefore, as web 202 and web 204 moved forward past roller 228, joining back half 103 and front half 105 of T-shirt 114, a seam is formed at the T-shirt 114 hemline. In some embodiments, fabric pieces 225 supplied to form the hemline seam of T-shirt 114 are dispensed from a continuous web of fabric 224 (not shown here) and cutter 232 cuts each of the fabric pieces 225 to an appropriate length based on the T-shirt size. In some embodiments, fabric pieces 225 are precut and coupled to a web 224 that is operable to dispense fabric pieces 225 one piece at a time at the appropriate cadence to remain in synch with the movements of web 202 and 204, resulting in the fabric piece 225 to join the two parts of a garment to be formed at the desired location on the garment to form a seam, a pocket, a zipper, a logo, etc. In some embodiments, the movement of web 202, web 204 and web 224 are continuous. In some embodiments, the movement of web 202, web 204 and web 224 follow a step movement. In some embodiments, one or more material web 224 may supply fabric pieces 225 to form a hemline, pockets, zippers and other ornamental or functional features. It should be understood that the fabric depositing devices may be located above web 202 and web 204, below web 202 and web 204, or some above one web and some below one web.

In some embodiments, folding tools or mechanisms 232 may be used to fold cut or uncut edges of one or more web 202 and web 204, before or after the deposition of adhesive on the article edges prior to folding and forming a seam. Folding tools and the formation of various types of seams will be further discussed in FIGS. 5 and 6. Note that the exemplary folding tools 232 of FIG. 2 are shown as operative in the X-Y plane. In alternative embodiments, folding mechanisms 232, adhesive dispensing mechanisms 230, and cutting mechanisms 234 are operable to cut, fold and create seams along any direction in the plane of the fabric or perpendicular to it. In some embodiments, some, or all folding tools 232, adhesive dispensers 230 and cutting tools 234 may be stationary. In some embodiments, some, or all folding tools 232, adhesive dispensers 230 and cutting tools 234 are mobile in one or more directions along one or more axes. Once the operations of adhesive dispensing, cutting and folding have been performed, rollers 228 or equivalent devices will join the two webs 202 and 204, each including part of the garment (as illustrated here each web includes either a front half or a back half of the garment) are brought together and pressure, steam, heat, lasers and other types of lights or radiation, and other operations are performed on the joined webs to activate and/or cure the applied adhesive 231 and permanently fuse the garment sections together. It should be understood that mechanisms other than rollers may be used to perform one or more operations designed to attach garment parts together depending on the type of fabric, the article design, the type of adhesive used and other manufacturing parameters. Cutting tools 236 may cut along the borders of the formed garment to detach the garment from the joined webs 202 and 204. The formed garment 114 may be collected in one stack while the joined web with the cutout 116 may be collected in a web 242 for disposal or additional processing. For example, the excess fabric remaining on the joined webs 202-204 may be used to create components for seams, pockets, belt loops, etc.

Figure 3:
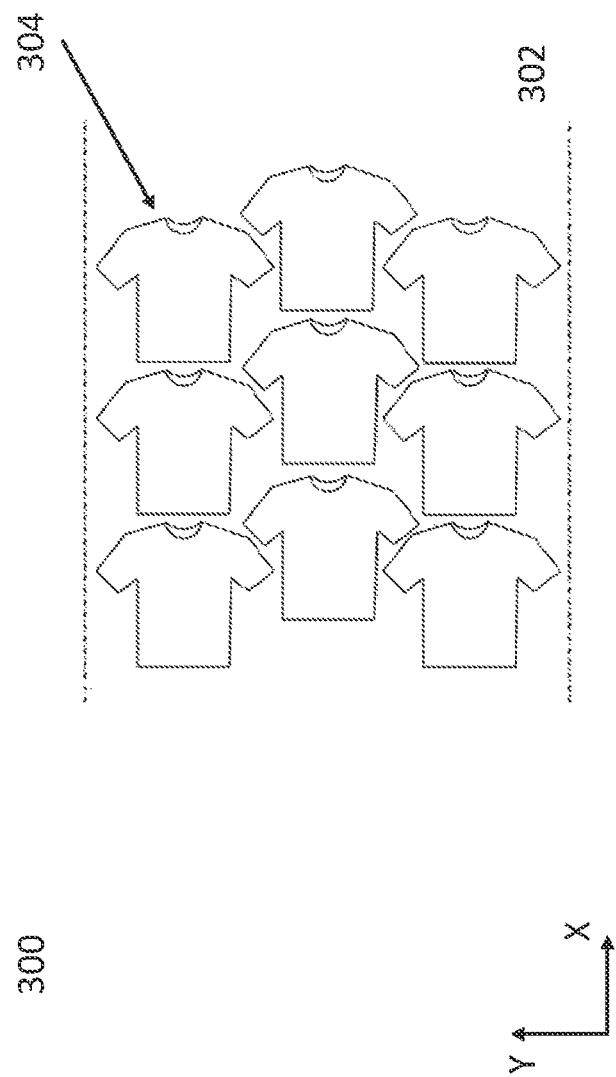
FIG. 3 illustrates alternative web layouts used in an automatic garment manufacturing system according to some exemplary embodiments.

FIG. 3. illustrates alternative web layouts used in an automatic garment manufacturing system according to some exemplary embodiments of the present disclosure. In some embodiments, an efficient garment pattern is laid out in panel layout 304 on the web 302 may be used to optimize a variety of factors. In some embodiments, developing a garment pattern layout 304 the web 302 requires optimizing various parameters including reducing fabric material waste, simplifying the layout and ease of implementing manufacturing operations. In some embodiments, optimum garment panel layouts are configured using computers, software and artificial intelligence.

Figure 4:
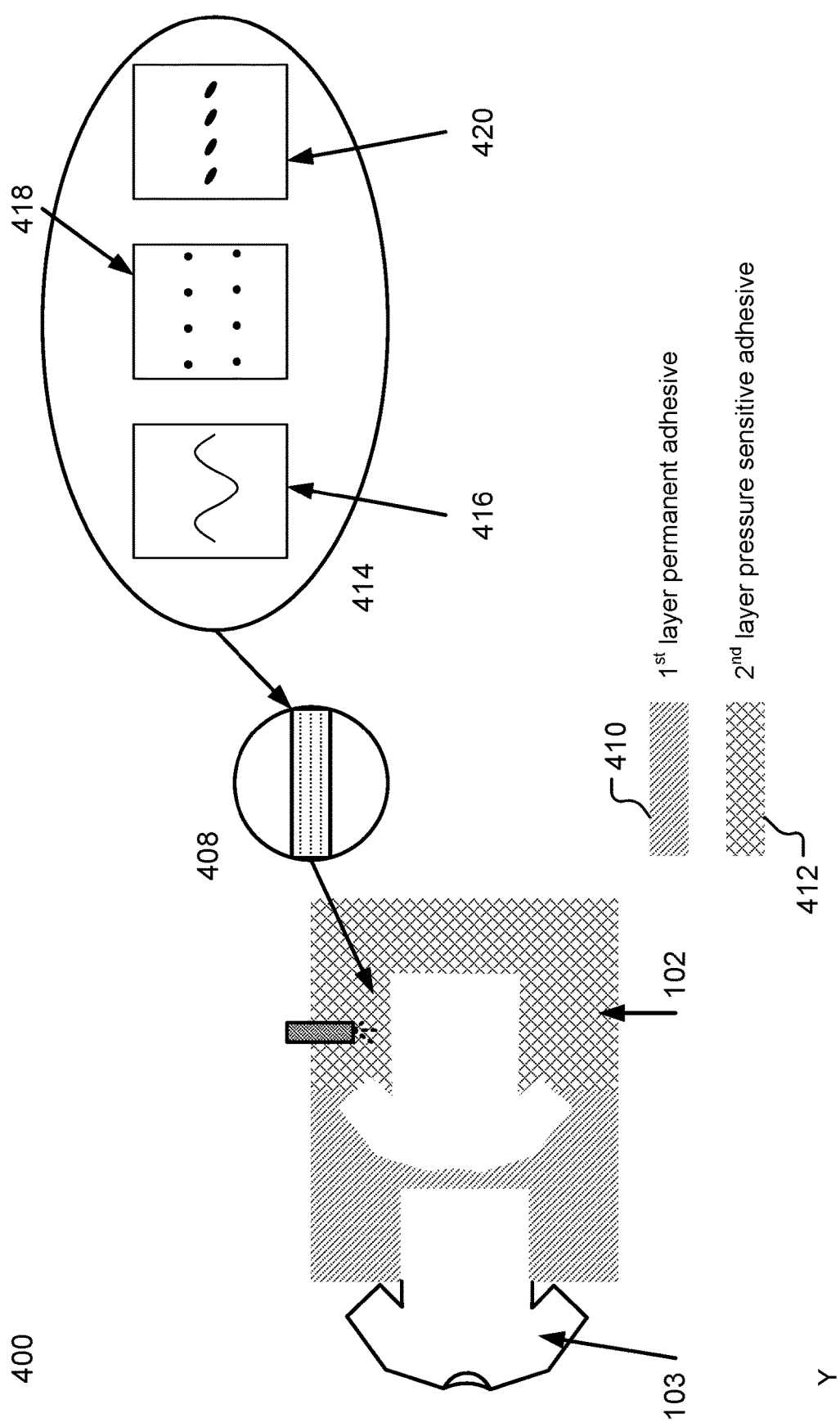
FIG. 4 illustrates methods of applying adhesive in an automatic garment manufacturing process according to some exemplary embodiments.

FIG. 4. illustrates methods of applying adhesive in an automatic garment manufacturing process according to some exemplary embodiments. In an exemplary system 400 of FIG. 4, adhesives are deposited along the borders of the back half 103 of T-shirt 114 while the back half 103 is still attached to the web 102. In exemplary embodiments, the adhesive may be applied in a solid, liquid, gel, or gaseous form. In some embodiments, the adhesive may be activated by heat, moisture in the air, pressure, lasers, lights or other forms of radiation, or a combination thereof. In some embodiments, the adhesive is applied to only one side of the garment, e.g. back half 103 in the illustrative example of FIG. 4. In some embodiments, adhesive may be applied to both sections of the garment 114, back half 103 and front half 105. In some embodiments, adhesive may be partially applied to each half of garment 114. In some embodiments, adhesive may be applied following different patterns for different sections of the garment 114 as the manufacturing requirements. In some embodiments, the perimeter for the application of adhesive to back half 103 (or front half 105 not shown in FIG. 4) may be defined to be larger or smaller than the actual size of the back half 103 (or front half 105 not shown in FIG. 4) of the garment. For example, the perimeter for the application of the adhesive to the back half 103 (or the front half 105) of the garment 114 may be larger than the boundaries of the back half of the garment 103 (or the front half 105). In that scenario, the subsequent cutting operation of the formed garment 114 may cut into the formed seam between the back half 103 and front half 105 of the garment 114 to achieve a desired functional or aesthetic property. In some embodiments, cutting into this border may be desirable to eliminate malformed seams or eliminate excess adhesive extrusions or bulging. In some embodiments, the garment border may be cut in such a manner to reduce the chances of garment fabric fraying. In some embodiments, the cutting process may be aided by heat to remelt the adhesive, the fabric or both at the newly cut joint to produce finished seams that are aesthetically pleasing, mechanically strong and durable or a combination of desired effects.

In some embodiments, the adhesion of back half 103 to the front half 105, or the adhesion of any other garment parts to another may be achieved using a laser fusing or bonding. In some embodiments, a laser beam may be used to provide heat energy to activate one or more layers of adhesive acting to bind garment components. In some embodiments, garment parts made of synthetic fibers may be fused together directly using heat in any form such as a laser to melt the synthetic fibers of the garment parts.

In some embodiments, adhesives may be dispensed in a single layer 408. In some embodiments, adhesives may be dispensed in one or more layers (e.g., layers 410 and 412). In some embodiments, a single formulation or type of adhesive may be used for all layers. In alternative embodiments, different types of adhesives with different properties may be used for different layers. In the illustrative example of FIG. 4, a hot-melt polyurethane (HMPUR) adhesive known for its application to garment fabric is used. One of the properties of HMPUR is its ability to react with moisture present in the air to change chemically and create a strong bond between materials. This bond may then continue to strengthen over 24-96 hours until it is fully cured. As such, HMPUR is a good adhesive for use with many types of textile materials. The HMPUR may be dispensed through a hot melt dispensing spray gun that can create specific graphic patterns on demand to allow for predetermined coverage and placement of adhesive on fabric. Other adhesives with different chemistry such as those of polyester, polyamide and epoxy may also be used.

In some embodiments, the adhesive is applied using one or more patterns 414, each pattern designed to achieve different properties. In some embodiments, the adhesive may be applied in a non-linear pattern such as serpentine, zig zag or curvilinear 416 manner within a defined band or border, along the perimeter of the back half 103 or front half 105 of garment 114. In some embodiments, certain adhesive patterns may provide a greater degree of movement or stretchability at the joint in a particular direction while still retaining sufficient seam strength. In some embodiments, the adhesive may be applied in discrete non-continuous dots 418, non-contagious stripes or ellipsoids 420, and positioned at one or more angles with respect to the borders of the garment. In some embodiments, the application of a pattern of non-continuous adhesive may impart the necessary bonding strength while reducing the amount of adhesive consumed as compared to a pattern requiring the continuous application of adhesive to the same area.

Figure 5:
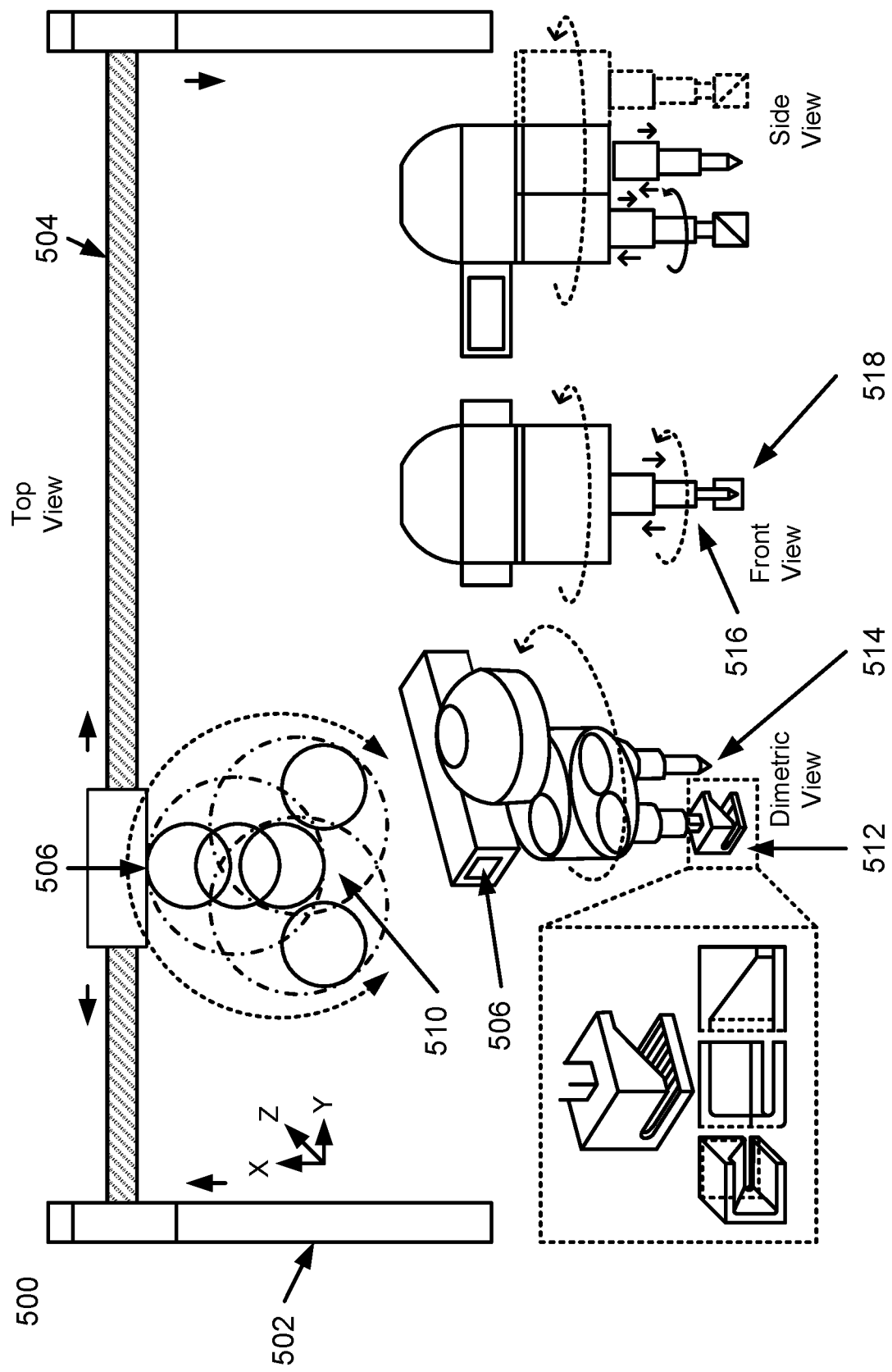
Figure 6:
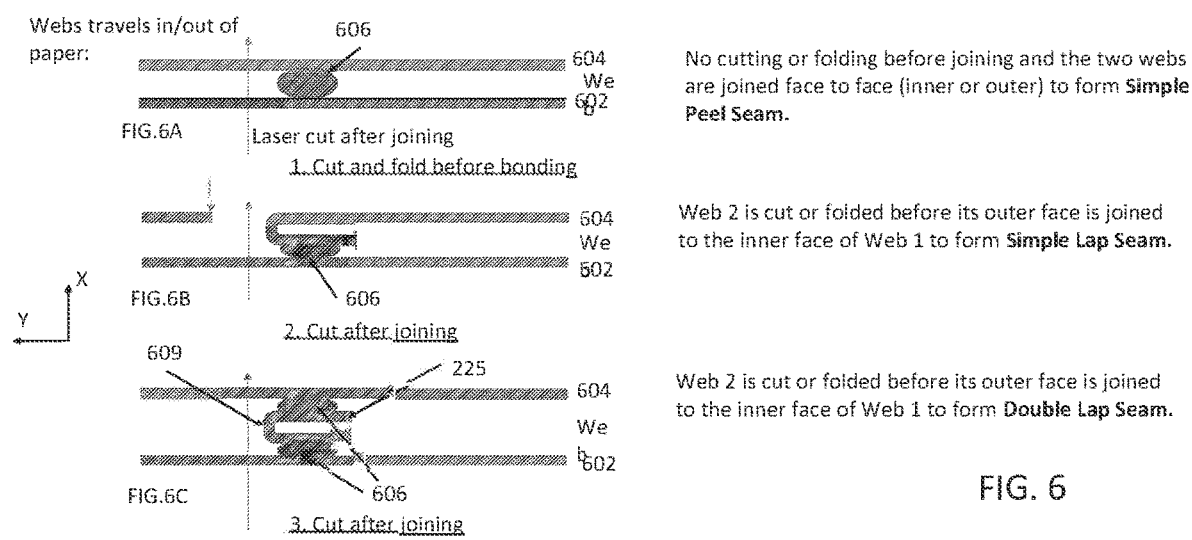
FIG. 6 illustrates exemplary methods of seam formation as used in an automatic garment manufacturing process according to some exemplary embodiments.

FIG. 5. illustrates exemplary systems for cutting, folding and seam formation according to some exemplary embodiments. As shown in FIG. 5, in some embodiments, the cut and fold mechanism 500 includes tools, structures and components allowing one or more cut/fold head(s) 510 to move in three dimensions, along the length of the web, along the width of the web, and in a direction perpendicular to the web. In some embodiments, rails 502 provide cut/fold head 510 mobility in a direction along the length of the webs 102, 104 (parallel to the X-axis as shown in FIG. 5) or any other web. Similarly, rail 504 provides for movement in a direction along the width of the webs 102, 104 (along the Y-axis as shown in FIG. 5) or along one or more directions with respect to other webs. In some embodiments, cut/fold head 510 may be operable to turn on an axis which may be at an angle or perpendicular to the plane of the webs 102 and 104. In some embodiments, cut/fold head 510 may include mechanisms that can retract or extend folding tool 512 or cutting tool 514, providing for movements perpendicular to the plane of the web 102, 104 or other webs (along the Z-axis, into and out of the page as shown in FIG. 5), to disable or enable the cutting and folding tools from engaging with the web. In some embodiments, the cut/fold head 510 includes actuators or motors that are operable to actuate the cut/fold head 510 in three dimensions. In some embodiments, actuator 506 includes one or more step motors, continuous motors, or other types of actuators that move cut/fold head 510 along rail 504. In some embodiments, rail 504 is coupled to rails 502 in such a way to allow rail 504 to move back and forth along the length of rails 502, providing for the cut/fold head 510 to travel along the length of webs 102 and 104 (X-axis) in addition to travels along the width of webs 102, 104 (Y-axis) or travel in the plane of other webs.

In some embodiments, cut/fold head 510 includes a folding tool 512 (also referred to as the folding head or folding mechanism) and a cutting tool 514. As shown in FIG. 5A illustrating a closeup view of the folding tool 512, in some embodiments, the folding tool 512 may include actuators that can extend or retract the folding tool 512 along an axis 516 (Z-axis) perpendicular to the plane of web 102, 104 or other webs. In some embodiments, the folding tool 512 includes gears, motors or other types of actuators that allow the folding tool 512 to rotate about an axis 518 (parallel to the Z-axis), providing finer movements of the folding tool 512. As shown in FIG. 5A, in some embodiments, the folding tool 512 may include an entry face 522 with a greater area or height, an exit face 524 with a smaller area or height, and a gradually narrowing channel 526 connecting the two faces 522 and 524. This design is operable to fold fabric edges as the folding tool 512 travels along a given path. As shown in FIG. 5, the folding tool 512 may move along any direction in three dimensions allowing the formation of seams corresponding to a variety of shapes and designs. In some embodiments, one or more folding tool 512 may be affixed to and stationary with respect to the garment manufacturing system but operable to allow webs 102 and 104 (or other webs not shown) to travel through the stationary folding tool. In the example of a fixed folding tool 512, as the fabric web 102 or 104 travels through a folding tool 512, it operates on the web and folds the fabric to form a fold and/or a seam. In some embodiments, folding tool 512 may include one or more apparatuses (not shown) such as rollers or plates operable to provide pressure and/or heat to enhance and/or maintain the folded edge of the web fabric 102 or 104, or to activate and cure any adhesives applied to form a seam. In some embodiments, one or more fixed folding tools 512 may operate alongside one or more mobile folding tools 512 to fold edges of web 102, web 104 or other webs, as the web in one or more directions. Fixed folding tools may be easier to implement but mobile folding tools provide greater flexibility. A non-stationary or mobile folding tool 512 as shown in FIGS. 5 and 5A that is operable to move in any direction in three dimensions and rotating in clockwise or counterclockwise directions up to 360 degrees with respect to a web would provide greater versatility to creating more complicated designs. In some embodiments, the cut/fold head 510 may include one or more folding tools 512, each including different physical or operational characteristics.

In some embodiments, the cut/fold head 510 includes a cutting tool 514. In some embodiments, each cut/fold head 510 may include a single tool such as a cutting tool 514 or a folding tool 512. In some embodiments, the cut/fold head 510 may include a cutting tool 514 and a folding tool 512 on the same tool head. In some embodiments, each cut/fold head 510 may include one or more cutting tools 514 and/or folding tools 512 based on the manufacturing processes and the garment design requirements. In some embodiments, the cutting tool 514 may be a mechanical cutter such as a knife, a blade, a scissor or needles. In some embodiments, the cutting operation is performed by needles that may perforate the borders of the garment 114 while leaving the garment 114 attached to the web until further processing completes the separation of the garment 114 from the joined webs 102 and 104. In some embodiments, the cutting tool 514 may use a laser cutter or other non-mechanical cutting devices. In some embodiments, the cut/fold head 510 may include one or more cutting tools 514, each including different physical or operational characteristics. In some embodiments, the cutting tool 514 may be extended or retracted along an axis (Z-axis) perpendicular to the plane of the web 102, 104 or other webs. In some embodiments, the cutting tool 514 may operate in a fixed direction with respect to the direction of travel of a web and thus be operable to cut the fabric in a fixed direction. In some embodiments the cutting tool 514 may travel along any path as defined by combinations of X,Y coordinates and rotate in clockwise or counterclockwise directions up to 360 degrees with respect to the web. The ability to rotate may be required of a mechanical cutter to produce non-linear seams. The same limitation may not apply to non-mechanical cutters such as a laser cutter. In some embodiments, a cutting tool 514 is in a static position in front of the folding tool 512 with respect to the direction of motion. In some embodiments, the cutting tool 514 and folding tool's 512 positions with respect to each other are adjustable prior to the start of the manufacturing operations and/or dynamically during the manufacturing operations. In some embodiments, the cutting tool 514 cuts the web fabric 102, 104 and other fabric webs per the garment design specifications. In some embodiments, as the cutting tool 514 cuts the web according to the design specifications, the folding tool 512 may engage in folding the cut sections of the fabric into a desired fold or seam shape. In some embodiments, seams are formed after applying adhesive, folding and/or cutting web material per a given design specification that dictates the sequence and coordinates for the application of each adhesive, fold and cut operation. Various seam shapes may be achieved using the cut/fold system and method described in this disclosure. Exemplary seam formations are further described below in FIGS. 6A-6C. In some embodiments, fixed or mobile folding head 514 may fold fabric and form a seam by applying adhesive to the fold prior to the folding operation, with or without the need to engage the cutting tool 514 to cut any fabric. As described herein, cutting tool 514, folding tool 512 and adhesive application tools 106 (FIG. 1) can move in three dimensions allowing for the formation of complex shapes that may be required by some article designs. However, in some embodiments, the cutting tool 514, folding tool 512 and adhesive application tools 106 may be stationary along one or more directions. In some embodiments, a combination of stationary and mobile cutting tools 514, folding tools 512 and adhesive application tools 106 may be used. In some embodiments, the folding tool 512 may include additional tools to apply pressure and/or heat to enhance or maintain the folded edge in shape after the fabric is folded by the folding tool 512. In some embodiments, the folding tool 512 is located close to rollers 228 (FIG. 2) (e.g. 10 mm to 100 mm). In some embodiments, the proximity of the folding tool 512 to the rollers 228 enhances the maintenance of the shape of the fold fabric because the folded fabric is kept taut under the tension in the web as it passes over the rollers 228 that changes the web's travel direction.

FIGS. 6A, 6B and 6C illustrate exemplary methods of seam formation as used in an automatic garment manufacturing process according to some exemplary embodiments. FIG. 6A illustrates the formation of a simple peel seam or superimposed seam. As seen from FIG. 6A, the peel seam is formed by the application of adhesive 606 in-between web layer 602 and web layer 604 in a face to face configuration. After the formation of a bond between the two webs, excessive fabric is cut away from outside the bondline, the edge of the bondline or at some distance into the bondline, providing a finished and aesthetically acceptable simple peel seam. The peel seam of FIG. 6A is relatively simple to fabricate because it does not require cutting or folding of the fabric before joining the two edges of web layer 602 and web layer 604. However, the peel joint may have relatively low strength against forces that are applied perpendicular to the joint resulting in the joint coming apart or "peeling."

FIG. 6B illustrates the formation of a simple lap seam. As seen from FIG. 6B, the simple lap seam is formed by the application of adhesive 606 between web layer 602 and web layer 604 in a face to back configuration. The simple lap seam of FIG. 6B is formed by first cutting and folding web layer 604 so as to have its outer face facing and adhesively joined to the inner face of the lower web layer 602. After a bond formation step, the excessive fabric in web 602 may be cut to form a finished simple lap seam. The simple lap seam of FIG. 6B provides a higher strength against forces that are applied perpendicular to the joint.

FIG. 6C illustrates the formation of a double lap seam. As seen from FIG. 6C, the double lap seam is formed by the application of a piece of fabric 225 (as shown in FIG. 2) partially or completely coated with adhesive 606 on one side 609 between web layer 602 and web layer 604. After bond formation, excessive fabric on web 602 and web 604 may be cut to form a finished double lap seam. Double lap seams as shown in embodiments of FIG. 6C provides a higher strength against forces that are applied perpendicular to the joint. An advantage of a double lap seam may be aesthetics because a double lap seam may provide a cleaner looking finished seam on a garment.

It would be apparent to one skilled in the art that the above bonded seam types are illustrative examples only. A variety of bonded seams may be formed using the cutting, folding, inserting processes described in this disclosure. It would be apparent to one skilled in the art that one or more types of bonded seams may be required by the design or manufacturing specifications of a particular garment, in addition to limitations and requirements imposed by the nature of the fabrics and adhesives, aesthetic, endurance, sealing or permeability requirements of individual seams.

Figure 7A:
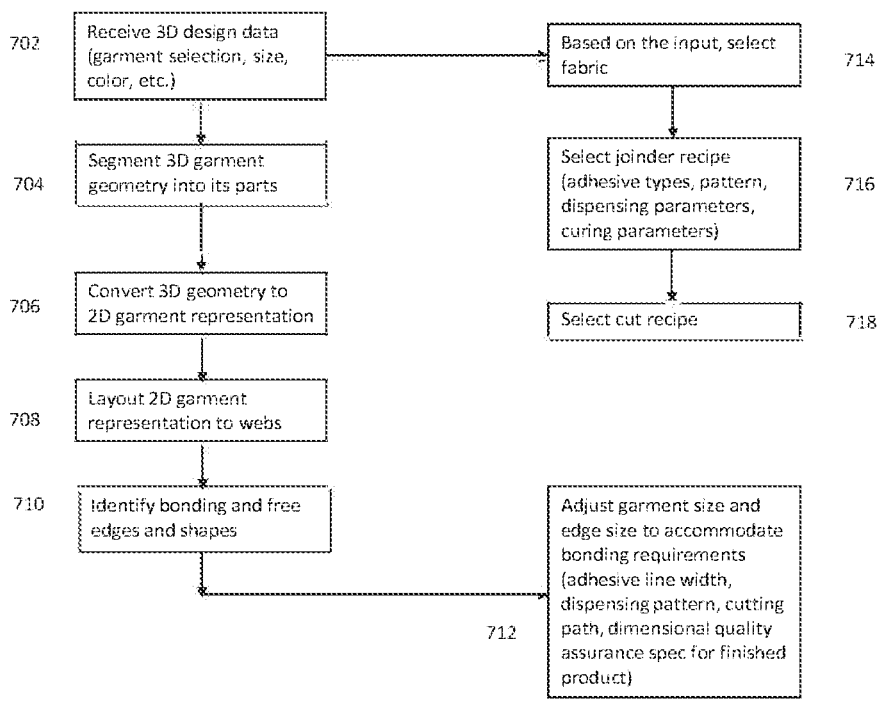
FIG. 7A illustrates an exemplary flow chart for processing design data used in an automated garment manufacturing process according to some embodiments.

FIG. 7A. illustrates an exemplary flow chart for processing design data used in an automated garment manufacturing process according to some embodiments. As seen in FIG. 7A, an exemplary automated garment manufacturing process using adhesive may start with the operation 702 of receiving garment manufacturing design data including the selection of a garment style, selection of colors, the types of accessories such as pockets and zippers that are required, personalization choices such as a logo created using various garment printing processes, embroidery or other embellishment using other accessories. Additional design data may include 3-D measurements, dimensions and sizes of the particular garment and other particulars of the article as measured in three dimensions, for example by a specialized scanner. In operation 702, based on the 3-D design data received, the garment type is selected (e.g. a T-shirt, long sleeve shirt or a jacket). Similarly, based on the received design data, fabric is selected and the size of the garment is determined. The size of a garment may be based on actual 3-D measurements in the case of custom fit garments or based on a ready-to-wear size chart. In the case of a custom fit garment, the measurements of the various parts of the garment are determined directly from actual measurements obtained either by a scanner or a manual measuring. In the case of a ready-to-wear garment, dimensions of the various garment parts such as the length, width and girth of the body of the garment, the sleeves, the neckline, etc. may be derived from the size of the garment derived from a generalized size to dimension correspondence table.

In operation 704, the three-dimensional garment design data are converted into the dimensions of individual components of the garment to be manufactured. The garment dimensions may include length and width of the body, the sleeves, the neckline, etc. of the garment. Based on the type of the fabric selected, the garment component dimensions may be adjusted to account for fabric properties such as stretch.

In operation 706, the 3-D geometries of the garment components are converted to a 2-D representation. In operation 708, the two-dimensional representations of the garment are mapped or laid out onto one or more fabric webs. In some embodiments, the pattern of mapping garment components on one or more fabric webs is laid out in panels in such a way to simplify fabrication, minimize material waste, or both.

In operation 710, based on the dimensions of the laid-out garment, the type of fabric or the aesthetic design of the garment, the bonding edges, shapes and the free edges of the garment are identified. The layout of the garment on the fabric web may include the steps of selecting which garment component panels are to be laid-out on which web, (e.g. right, left, upper or lower web). Additionally, considerations for the layout of the garment panels may include laying out the garment pieces inside-out or outside-in, headfirst or bottom first, etc.

In operation 712, the garment layout dimensions may be adjusted to accommodate the appropriate bonding border requirements including adhesive line width, adhesive dispensing pattern, cutting path and dimensional quality assurance specification for the finished garment.

In a parallel process flow path, in operation 714, based on the received 3-D garment design data, the automated garment manufacturing system 100 may select the corresponding fabric web and load each fabric web in preparation for the start of manufacturing. In some embodiments, the selection and loading and preparation of the fabric web may be performed manually, semi-manually or automatically. In some embodiments, some or most of the material handling operations required at this step may be done automatically, for example using robots and cobots.

In operation 716, based on the garment design data, a joinder recipe is selected which determines the adhesive type to be used, the adhesive patterns (straight, zigzag, serpentine) and the adhesive curing parameters.

Finally, in operation 718 the cutting recipe is determined based on garment design data. For example, a particular cutting recipe may be used to minimize material waste or achieve a certain aesthetic design requirement.

Figure 7B:
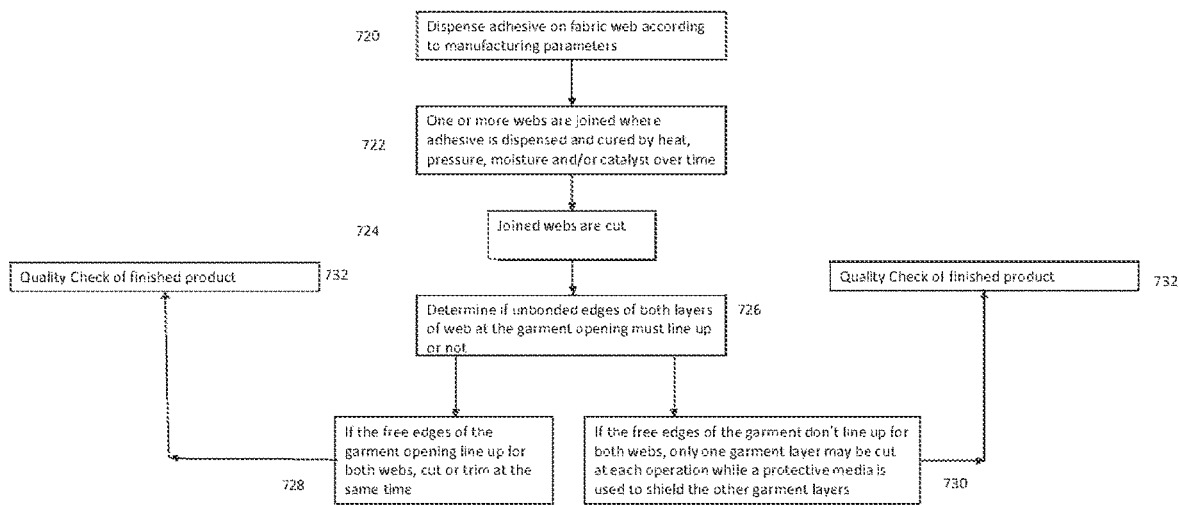
FIG. 7B illustrates an exemplary flow chart for cutting and joinder processes used in an automated garment manufacturing process according to some embodiments.

FIG. 7B. illustrates an exemplary flow chart for cutting and joinder processes used in an automated garment manufacturing process according to some embodiments. The operations detailed in FIG. 7B are generally directed to forming edges and seams for a garment in an automated fashion.

In operation 720, adhesive is applied to one or more moving fabric webs per the manufacturing recipe created in operation 716. In operation 722, one or more webs are joined at least along areas where adhesive has been applied. Heat, pressure, moisture, radiation and/or catalysts may be applied for a given period of time (as per the manufacturing recipe) to the joined areas to activate and cure the bond between the joined web regions. Each of the parameters used to create a joint may be individually tuned and adjusted to achieve the optimum bonded joint based on the garment type, the joint type, dimensions, type of adhesive, whether the joint must be waterproof or not, and the aesthetics of the joint.

In operation 724, the joined regions that are formed by bonding one or more web areas together are cut on the outside perimeter of the joint, along the edge of the joint or at some distance within the joint. In some embodiments, the cutting along the joints may be complete along the entire garment perimeter, in which case the garment is thereafter fully detached from the webs. In some embodiments, the cutting operation may be limited to specific boundaries of the garment that may include bonded edges and free edges where no adhesive has been applied. In some embodiments the cutting operation may achieve both a functional and an aesthetic function. In some embodiments, the cutting operation may be limited to certain areas of the garment perimeter and the garment remains attached to the fabric webs until further processing. In some embodiments, the cutting is performed using needles to perforate the web but not to completely detach the garment from the web. In some embodiments, the final detachment of the garment from the web may be performed at a later stage in the garment manufacturing.

In some embodiments, in operation 726, based on the garment design data and the corresponding manufacturing requirements, the system determines whether each layer of a garment part with unbonded free edges (e.g. sleeve holes, neck hole) must align to each other or not. For example, for increased comfort wear, some T-shirt designs may require the layer of fabric forming the back of the neck section to be longer (taller as measured from the T-shirt hemline) than the front layer of fabric comprising the neck hole.

In some embodiments, in operation 728, if the garment design data requires the open edges of the garment in some area to be aligned between the two webs, then a single cutting operation may be performed on both layers of the garment. For example, both the lower and upper layers of fabric forming the sleeve hole may be cut in a single cut operation.

In some embodiments, in operation 730, if the garment design data requires the opening fabric edges not to align (e.g. the fabric layer of the back of neck hole must be longer than the fabric layer at the front of the neck hole), for each cutting operation, one fabric layer may be cut while the other fabric layers may be protected by an insert between the cutter and the other layers of fabric. For example, in the case of some T-shirt necklines, the edge of the back layer of fabric for the neck hole must be higher than the edge of the front layer of fabric for the neck hole. In such cases, the cutting operation may be performed in separate steps, using one or more cutters to cut a given fabric layer while protecting other fabric layers using a protective insert.

In operation 732, a quality inspection of the finished garment may be performed. In some embodiments, the quality inspection may be performed by human operators through a visual inspection. In some embodiments, a quality inspection may be performed using cameras using artificial intelligence. In some embodiments, the quality inspection may be performed while the finished garment is still attached to the web to simplify any material handling issues.

Figure 8:
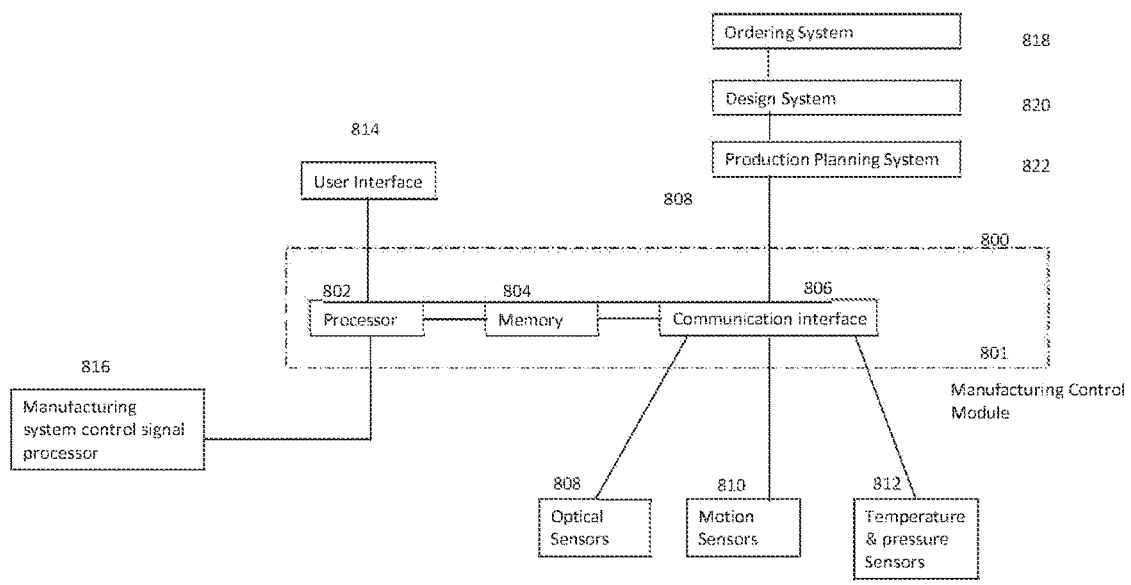
FIG. 8 illustrates an exemplary block diagram of a control system for an automatic garment manufacturing system according to exemplary embodiments.

FIG. 8. illustrates an exemplary block diagram of a control system for an automatic garment manufacturing system according to exemplary embodiments.

In some embodiments, the illustrative control system 800 includes a manufacturing control module 801 coupled to various components including one or more ordering system 818, one or more design systems 820, one or more production planning systems 822, one or more user interface devices 814, and one or more manufacturing system and control signal processor. In some embodiments, the manufacturing control module 801 may include one or more processors 802 coupled to memory modules 804 and one or more communication interfaces 806 to provide means for communicating with various automated garment manufacturing system inputs including one or more optical sensors and/or cameras 808, motion sensors 810 and temperature and pressure sensors 812. In various embodiments, various other types of sensors, not shown here, may provide relevant manufacturing parameters such as the level of moisture present in the factory air, viscosity of adhesive liquid, etc. Additionally, the manufacturing control module may include one or more power sub-systems and power backup systems not shown here.

The manufacturing control module 801 may be implemented at least partially in one or more computers, embedded systems, terminals, control stations, handheld devices, modules, any other suitable interface devices, or any combination thereof. In some embodiments, the components of manufacturing control system 801 may be communicatively coupled via one or more communications buses not shown here.

Processing equipment 802 may include a processor (e.g., a central processing unit), cache, random access memory (RAM), read only memory (ROM), any other suitable components, or any combination thereof that may process information regarding the automated garment manufacturing system 100. Memory 804 may include any suitable volatile or non-volatile memory that may include, for example, random access memory (RAM), read only memory (ROM), flash memory, a hard disk, any other suitable memory, or any combination thereof. Information stored in memory 804 may be accessible by processing equipment 802 via communications bus not shown. For example, computer readable program instructions (e.g., for implementing the techniques disclosed herein) stored in memory 804 may be accessed and executed by processing equipment 802. In some embodiments, memory 804 includes a non-transitory computer readable medium for storing computer executable instructions that cause processing equipment 802 (e.g., processing equipment of a suitable computing system), to carry out a method for controlling the automated garment manufacturing systems and processes. For example, memory 804 may include computer executable instructions for implementing any of the control techniques described herein.

In some embodiments, communications interface 806 includes a wired connection (e.g., using IEEE 802.3 ethernet, or universal serial bus interface protocols), wireless coupling (e.g., using IEEE 802.11 "Wi-Fi," Bluetooth, or via cellular network), optical coupling, inductive coupling, any other suitable coupling, or any combination thereof, for communicating with one or more systems external to manufacturing control module 801. For example, communications interface 806 may include a USB port configured to accept a flash memory drive. In a further example, communications interface 806 may include an Ethernet port configured to allow communication with one or more devices, networks, or both. In a further example, communications interface 806 may include a transceiver configured to communicate using 4G standards over a cellular network.

In some embodiments, user interface 814 includes a wired connection (e.g., using IEEE 802.3 ethernet, or universal serial bus interface, tip-ring-seal RCA type connection), wireless coupling (e.g., using IEEE 802.11 "Wi-Fi," Infrared, Bluetooth, or via cellular network), optical coupling, inductive coupling, any other suitable coupling, or any combination thereof, for communicating with one or more of user interface devices 814. User interface devices 814 may include a display, keyboard, mouse, audio device, any other suitable user interface devices, or any combination thereof. For example, a display may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. Further, a display may include a touchscreen, which may provide tactile interaction with a user by, for example, offering one or more soft commands on a display screen. In a further example, user interface devices 814 may include a keyboard such as a QWERTY keyboard, a numeric keypad, any other suitable collection of hard command buttons, or any combination thereof. In a further example, user interface devices 814 may include a mouse or any other suitable pointing device that may control a cursor or icon on a graphical user interface displayed on a display screen. In a further example, user interface devices 814 may include an audio device such as a microphone, a speaker, headphones, any other suitable device for providing and/or receiving audio signals, or any combination thereof. In some embodiments, user interface 814, need not be included (e.g., control module 801 need not receive user input nor provide output to a user).

In some embodiments, a sensor interface (not shown) may be used to supply power to various sensors, a signal conditioner (not shown), a signal pre-processor (not shown) or any other suitable components, or any combination thereof. For example, a sensor interface may include one or more filters (e.g., analog and/or digital), an amplifier, a sampler, and an analog to digital converter for conditioning and pre-processing signals from sensor(s) 808, 810 and 812. In some embodiments, the sensor interface communicates with sensor(s) via communicative coupling which may be a wired connection (e.g., using IEEE 802.3 ethernet, or universal serial bus interface), wireless coupling (e.g., using IEEE 802.11 "Wi-Fi," or Bluetooth), optical coupling, inductive coupling, any other suitable coupling, or any combination thereof.

Sensor(s) 808, 810 and 812 may include any suitable type of sensor, which may be configured to sense any suitable property or aspect of automated garment manufacturing systems and processes 100, any other system, or any combination thereof. In some embodiments, sensor(s) 808, 810 and 812 include linear encoders, rotary encoders, or both, configured to sense relative positions, speed, temperature, pressure, etc. In some embodiments, sensor(s) includes various types of optical sensors 808 including cameras configured to capture images (e.g., time-lapse imaging) of various aspects of the operation of the automated garment manufacturing systems and processes. In some embodiments, temperature and pressure sensor(s) 812 include one or more temperature sensors such as, for example, a thermocouple, a thermistor, a resistance temperature detector (RTD), any other suitable sensor for detecting temperature, or any combination thereof. For example, sensor(s) 812 may include a thermocouple arranged to measure the temperature and/or viscosity of liquid adhesive to be applied to the webs.

Figure 9:
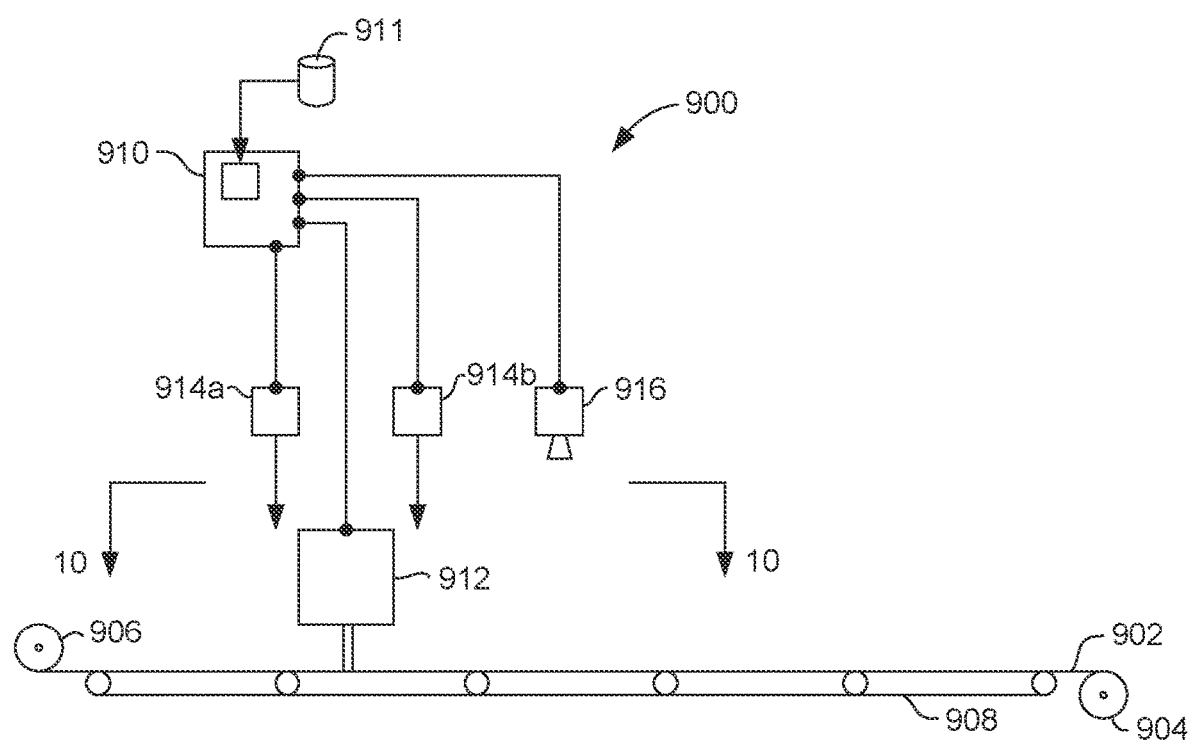
FIG. 9 is a side, schematic view of a manufacturing system employing computer inspection to confirm accuracy of manufacturing processes.

Computer Inspection Measurement Validation:

FIG. 9, shows a side schematic view of an embodiment wherein a computer inspection system 900 can be implemented to validate and check measurements and implementation of a manufacturing process such as could be used in the manufacture of garments, textiles upholstery products, etc. In one possible embodiment, the computer inspection system 900 can be implemented in a garment manufacturing process that can perform manufacturing operations on a web of fabric 902, which can be supplied by and retrieved from rolls 904, 906, and which can optionally be moved by a conveyor belt 908. In some embodiments, the web of fabric 902 acts as its own conveyor and is directly conveyed along the manufacturing line. In this case the web of fabric 902 can be suspended between rolls 904, 906 or other structures, such as described above with reference to FIGS. 1-8. In one possible embodiment, the computer inspection system 900 can be implemented in a manufacturing system such as described above with reference to FIGS. 1-8, although that is only by way of example of one or more possible manufacturing environments in which the system 900 might be used.

The computer inspection system 900 can include an operating system 910, that can include circuitry, software and computer memory, and which is operable to receive manufacturing data 911 and to deliver machine readable instructions to tooling 912. The tooling 912 can be, for example, cutting tooling which can include one or more blades, scissors, saws, lasers, etc. that can be operable to cut one or more pieces of fabric 902. The tooling 912 could also be some other type of tooling, such as tooling for selectively applying adhesive to or stitching the fabric 902. The tooling 912 could also be robotic tooling for embellishing the fabric in different ways. The tooling 912 could also be an embroidery tooling, a digital printing tooling, a silk screen tooling, etc. Possible embodiments of the tooling 912 will be further described in greater detail herein below.

The computer inspection system 900 can include one or more projectors 914a, 914b, and one or more inspection components 916. The inspection components may include one or more video camera, still frame camera, spectrometer, camera capable of capturing electromagnetic waves outside the visible light frequencies, or some other type of device capable of receiving visual information from the workpiece (e.g. fabric 902) and one or more images displayed by the one or more projectors 914a, 914b. In some embodiments, multiple cameras of the same or different types are strategically located above the inspection area to circumvent any blockage by tools performing operations on the manufacturing articles. In some embodiments, the cameras may be located above, in line or below the inspection area to provide full viewing of the article and any operations being performed, unencumbered by obstructions of tools or other items that may be blocking the field of view of one or more cameras.

Figure 10:
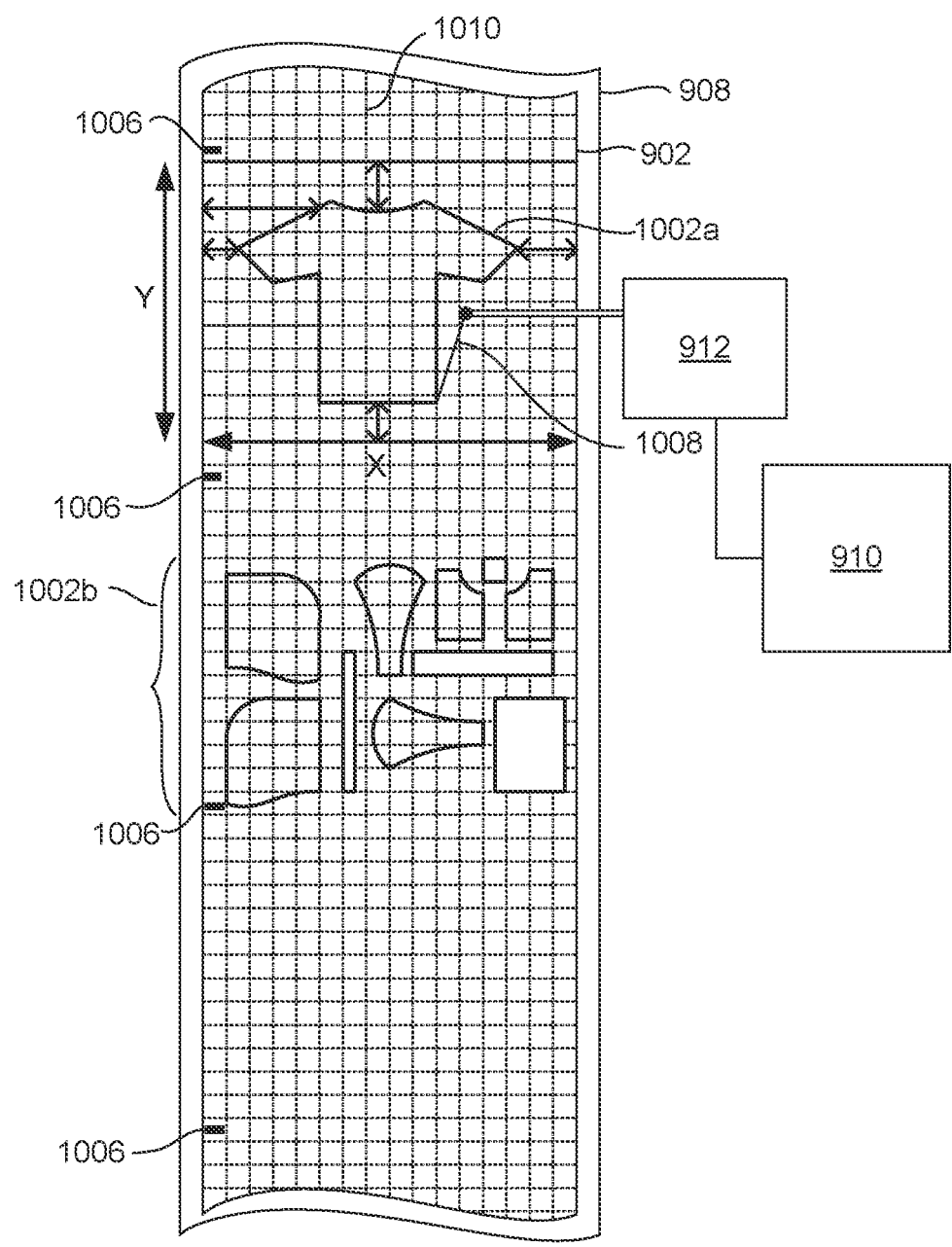
FIG. 10 is a top-down view taken from line 10-10 of FIG. 9, illustrating a projection on a workpiece for use in implementing computer inspection measurement validation according to a possible embodiment.

FIG. 10 shows a top-down view as seen from line 10-10 of FIG. 9 and illustrates a possible implementation of the computer inspection system 900 of FIG. 9. In one possible embodiment, a projector 914a (FIG. 9) can project an image of a pattern to be processed on the fabric 902. In some embodiments, the projector 914a may project images using lasers, visible light or light with wavelength outside the visible spectrum. For example, the projector 914a can project an image of a garment panel 1002a which in the embodiment illustrated in FIG. 10 is a desired outline of a shirt panel (e.g. front or back panel of a T-shirt). A projector 914b (FIG. 9) may also project a grid pattern 1004 or other reference pattern onto the fabric 902. In some embodiments, the projector 914b may project images using lasers, visible light or light with wavelength outside the visible spectrum. While the projection of the panel pattern 1002a and grid 1004 can be displayed from two separate projectors 914a, 914b, they could also be displayed by a single projector 914. In one embodiment, one or more of the projectors 914 can be projecting a laser, visible light or light with wavelength outside the visible spectrum. However, the projectors 914 could also be still or video displayed projectors using focused non-laser light.

In the above-described embodiment the projection 1002a is a projection for a single garment panel. However, a projection 1002b may display an image containing many panels arranged and laid out on a fabric web to minimize fabric waste by arranging the panels in an efficient layout on the fabric web 902.

As described above, the tooling 912 is operable to receive instructions from the control system 910 and to perform certain manufacturing operations on the fabric 902. As discussed above, these manufacturing operations can include, for example, cutting, forming a seam, applying adhesive, applying decorative features, embroidering, printing, silk-screening, etc. As mentioned, the tooling can be configured to perform these operations very accurately. Although the tooling can be programmed and operable to accurately perform these manufacturing operations, various situations can occur that can cause the operation to be performed in an inaccurate or compromised manner, which can lead to scrap or wastage of materials and time. This is especially problematic with the manufacture of items from material such as fabric, upholstery, etc., such as in the manufacture of garments, fashion accessories, etc. This is in part due to the pliable, flexible, non-rigid nature of such material.

In one embodiment, the computer inspection system 900 may be operable to monitor the performance and accuracy of the tooling 912 operations to determine any deviations and discrepancies. For example, as shown in FIG. 10, the tooling 912 can perform a process such as cutting, forming a seam or dispensing adhesive etc. In FIG. 10, the tooling is shown to be deviating from its desired location or trajectory as indicated by line 1008. However, because the projection 1002a indicates the intended location or trajectory of the manufacturing operation, the deviation 1008 can be detected and corrected. In addition, the location of the manufacturing process can be compared with a grid pattern 1010, to determine whether the process is being performed in a correct manner at a correct location on the fabric or other material 902. The grid pattern can provide a reference to accurately determine a location of the pattern 1002a in two dimensions X and Y.

In some embodiments, any web fabric deformity such as wrinkles may result in manufacturing problems and potential defects (as will be described in greater detail herein below). With regard to the fabrication of items such as garments, such fabrication may require accuracy down to the millimeter level or less. In addition, there may be situations wherein patterns, features and graphics printed on the fabric need to be taken into account during manufacturing to ensure an aesthetically appealing finished product. Such printed features may not be consistently, accurately printed on the fabric material 902 but may still need to be accounted for.

Figure 11:
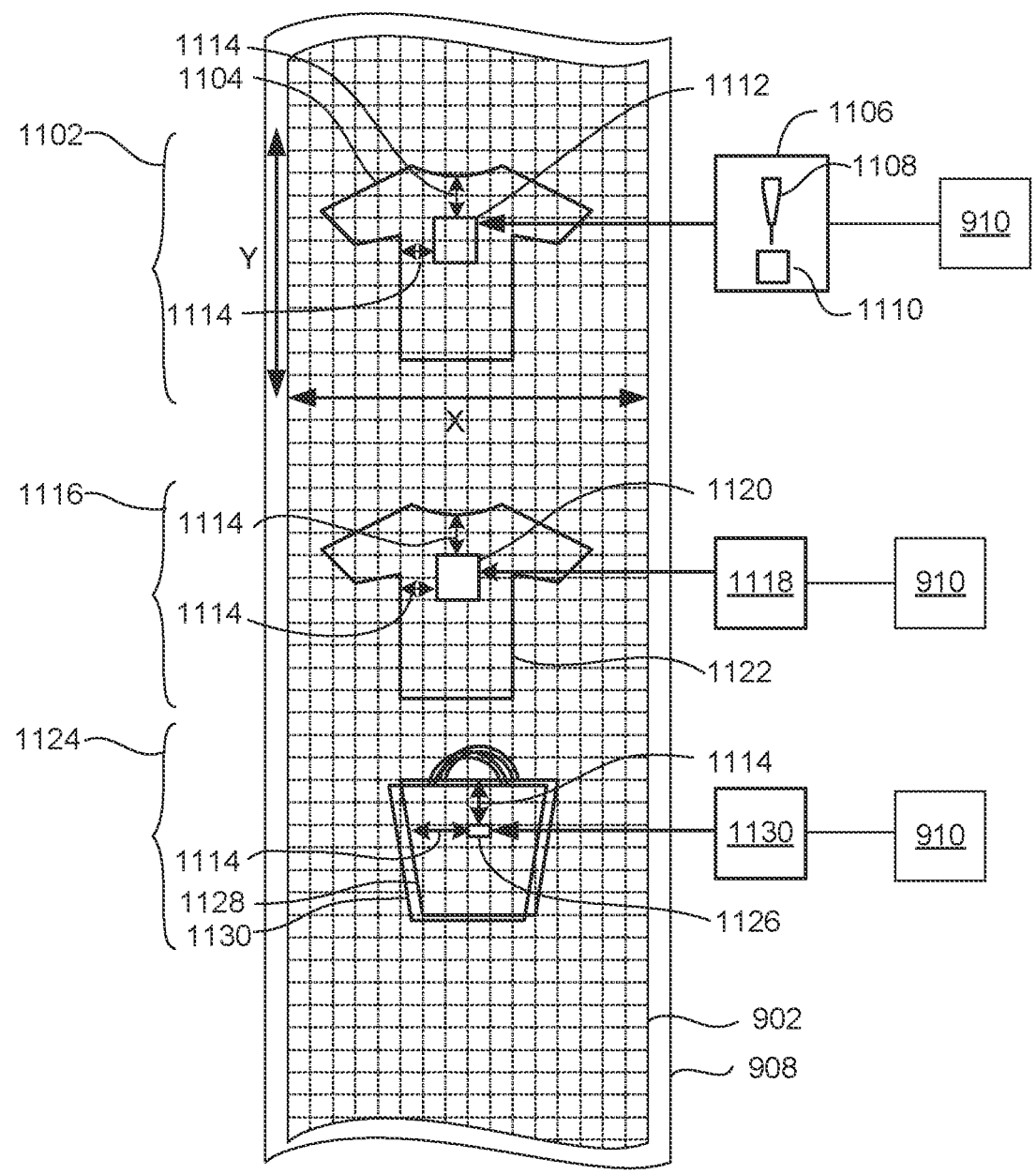
FIG. 11 is a view similar to that of FIG. 10, showing projections for use in implementing computer inspection measurement validation in various manufacturing implementations according to several embodiments.

The computer inspection system 900 can act as a system and method to increase quality assurance and verification of the manufacturing and to ensure and/or verify that the tooling is performing the desired operation at the desired location, and with the optimal accuracy along the correct path on the fabric 902, and verify or detect an assembled article's correct placement and orientation (e.g. T-shirt 1122 of FIG. 11). In one possible embodiment, the data provided to the projectors 914a, 914b (FIG. 9) may be derived from the same data set (or related data) as the data provided to the tooling 912. This information can include Computer Assisted Drafting (CAD) data, Computer Numerical Control (CNC) data, etc. As a result, the image 1002 projected onto the fabric 902 should ideally align with the operation performed by the tooling. However, many situations may arise to prevent this from being the case.

In one embodiment, the computer or automated inspection system 900 can be used to determine maximal dimensions X, Y in an x/y plane as shown in FIG. 10. The maximal dimension X may be determined by the width of the fabric or by some feature of the fabric. The maximal Y dimension may be determined, for example, by a step-wise series of operations that must be performed in a coordinated manner with respect to one another. For example, with reference back to the processes described above with regard to FIGS. 1 and 2, the adhesive deposition or cutting processes performed on webs 102, 104 must be accurately aligned and in sync in the X and Y directions to ensure that features 103, 105, such as seam for the hem, neck-hole or other features are properly formed. In the example of webs 102 and 104, each fabric web 902 has to reach the proper location at the appropriate time, in sync with the other web for the adhesive dispensing and seam formation to be performed successfully. The computer inspection of the projection 1002a, 1002b can determine if the data provided to the tooling 912 would cause the processed panel or panels to fall outside of this allotted maximal, such as if the panel is too large, extends off the edge of the fabric, or falls outside of the allotted space in the X or Y directions.

As illustrated in FIG. 10, in order to more accurately determine and control the operation (e.g. cutting, dispensing adhesive, forming one or more seams, etc.) in the Y direction the fabric or material 902 can be printed, marked or scored with visual or mechanical markers 1006 that can be located at predetermined periodic intervals separated by a predetermined distance. This can provide a reference point for the fabric in the Y direction that can be compared with the product projection 1202a and/or grid pattern 1010. The defects or features in the X direction can be determined by viewing the outer edges of the fabric 902 as compared with the projection 1204 and/or grid 1010. In another example, the computer inspection system 900 may identify misalignment in any direction in the X-Y plane. For example, when a cutting operation is being performed, if the cutting tool deviates from the desired direction, the computer inspection system 900 may detect the deviation as judged against the projected grid pattern 1010 or other projected or actual landmarks. FIG. 11 illustrates the use of the computer inspection system to improve manufacturing in the application of a feature such as a decorative, ornamental or functional feature or item. Region 1102 illustrates the use of a computer inspection in conjunction with an embroidery tooling 1106 to act as a quality control measure to ensure proper placement of an embroidery process on an item such as a garment or bag. The embodiment in region 1102 shows a projection 1104 of a shirt panel. However, this is by way of example, as this embodiment could be implemented with any type of garment, accessory or other item. This implementation can employ an embroidery machine 1106, which may include at least one needle 1108 and at least one bobbin 1110. Although shown at the side of the garment projection 1104, the embroidery machine could be arranged such that the fabric material 902 is located between a needle 1108 and the bobbin 1110. The embroidery machine can receive instructions or signals from the control system 910 to control operation of an embroidery process. The use of a computer inspection system 900 as described above can be especially beneficial in the embroidery process to ensure that the embroidery pattern 1112 is formed at a correct location and orientation relative to the garment features and contours (or other intended features or markers). For example, the computer inspection system can ensure that embroidered pattern 1112 is located at a desired distance and orientation from certain features such as the edges of the projected pattern or the edge of an actual article, as indicated by arrows 1114. In some embodiments, the computer vision system 900 may compare the actual position and/or orientation of an article against a projection of the same article by the computer vision system and a projected grid to detect misalignments, incorrect placements or orientation of the article and/or accurate movement of the operating tool (the embellishment tool in this example).

With continued reference to FIG. 11, as shown in region 1116 the computer inspection system can be beneficial in a process wherein a decorative feature is applied to a garment or other item, such as by digital printing (or silk screening). This embodiment can employ a printing tool, such as a direct to garment (DTG) tool or other type of printing tool 1118 to print a decorative or informative design or pattern at a desired region 1120 on a garment or other item. The printing tool 1118 can receive instructions from the control system 910 to perform the desired printing process. As previously described, the control system 910 can employ a computer inspection system to ensure that the printed feature 1120 are formed at the desired location and/or orientation relative to one or more features, or markers of the item projection as indicated by arrows 1114 such as by comparing the projection 1122 with the grid. In some embodiments, the computer inspection system 900 can detect a faulty operation and flag the corresponding article as one to be manually inspected and/or rejected.

In some embodiments, the computer inspection system 900 can ensure proper location and/or orientation of an ornamental or functional feature on an actual finished or partially finished item. For example, in region 1124 of FIG. 11, item of manufacture 1128 can be an actual manufactured bag or other article. This item can be viewed and compared with a projection 1130 of the item 1128 and/or can be compared with the projected grid to ensure that the feature 1126 (e.g. a personalization design or embellishment) is properly located and oriented on the physical item 1128. In some embodiments, the cameras in the computer inspection system 900 would capture an image of the location where the embellishment is being performed and be able to compare it to the image of the projection of the location where the embellishment is being performed and by comparing the images, and in some embodiments using artificial intelligence based vision, the system can detect a deviation from the projection, signaling a potential defective embellishment. In some embodiments, the system may flag the article for rejection, or a manual inspection. In some embodiments, comparison of the position and orientation of an article as compared to a projected grid 1004 may further help identify any defective operations, placement or orientation of the embellishment and flag the article for further inspection or rejection. The projection 1128 shown in FIG. 11 as being a handbag for purposes of illustration, but could be any article of manufacture such as a garment, accessory item etc. The item 1126 could be a decorative item that could include a logo or information regarding the item such as material list, wash and care instructions, etc. The item 1126 could also be a functional item, such as but not limited to a button, zipper, rivet or other reinforcement, handle, latch, etc. Robotic or other automated tooling 1130 can receive instructions from the control system to attach the item 1126 to the fabric or other material 902, such as by stitching, adhesive, welding, etc. As with the previously described embodiments, the control system 910 can employ the above described computer inspection system 900 to ensure that the item 1126 is located at the correct distance and orientation from one or more features of the article of manufacture 1128 by comparing the article of manufacture with the projection 1130 or grid 1010 as indicated by arrows 1114. In some embodiments, the control system 910 may use artificial intelligence to complement the computer inspection system 900 to automatically recognize and detect manufacturing defects that specific to certain processes such DTG printing.

Figure 12:
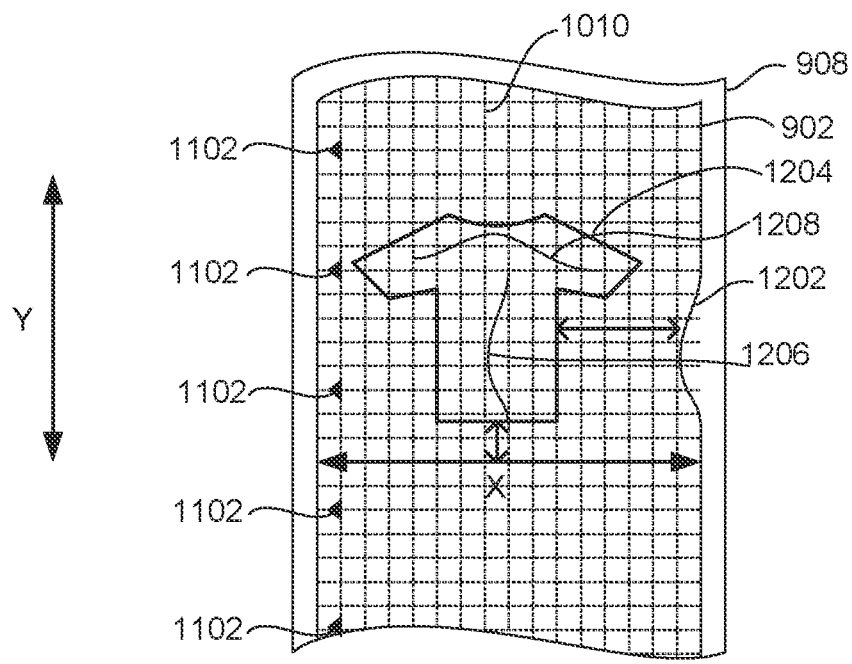
FIGS. 12-14 show top-down views of implementation of computer inspection measurement validation to solve various types of manufacturing challenges.

The use of the above-described computer inspection system 900 can be useful in overcoming manufacturing challenges that can arise especially in the fabrication of items from flexible, non-rigid materials such as fabrics, upholstery, etc. FIG. 12 illustrates an example of such a challenge. When manufacturing items such as garments or accessories or other items from a flexible material such as fabric, the material 902 can become undesirably deformed. For example, when the fabric 902 is laid on top of a conveyor belt 908 or in absence of such a conveyor belt 908, when a continuous web of fabric is suspended between support structures such as rollers such as previously described, the material 902 may become wrinkled, folded, twisted, bent or otherwise unintentionally deformed. This problem is further exacerbated by the fact that when manufacturing items such as garments made from natural or synthetic fabrics, if the fabric experiences tensile strain, it may cause the temporary stretching of the fabric and resulting in a distortion of the fabric material and any related graphics, designs, markers and causing a manufacturing defect (such as an aesthetic defect) of the finished good.

FIG. 12 illustrates a situation where the fabric has an unintended deformation such as a wrinkle 1206. Although the item projection 1204 may appear to be correctly shaped, the finished item may not be properly formed, because the material itself is not flat and uniform. Line 1206 indicates a wrinkle that runs primarily in the Y direction, thereby distorting the material web 902 in an X and/or Z directions as indicated by the distorted outer edge 1203 of the fabric web. Such a deformation of the fabric web 902 can be detected by comparing the edge 1203 of the fabric web 902 with the projected grid to determine that a portion of the web has been distorted. Line 1208 indicates a wrinkle running primarily in the X direction, which distorts the material web 902 in the Y direction. In one embodiment, such a wrinkle may be detected by measuring the marker 1202 spacing as measured against the grid with markers 1202 and the separation distance of markers 1202 on a fabric with no wrinkles, as further described below. In some embodiments, the markers 1202 are visual landmarks printed on the fabric web 902. In some embodiments the markers 1202 are visual landmarks printed on the fabric using visible ink. In some embodiments, the markers 1202 are printed on the fabric using ink not visible to the naked eye but visible and detectible via the help of special cameras. In some embodiments, the markers 1202 are imprinted on the fabric using non-permanent ink that can be erased by washing the fabric or using other processes. In some embodiments, the markers 1202 are physical landmarks such as punched holes or indented areas in the margins of the fabric web 902. In some embodiments, the markers 1202 are spaced one millimeter apart. In some embodiments, the markers 1202 are spaced by a distance less than or greater than one millimeter depending on the requirements of the manufacturing operations and required tolerances. In some embodiment, a wrinkle running in the Y direction may be detected because the wrinkle will cause a deviation of the T-shirt border by evaluating the projection of the T-shirt and its actual location as compared the projected grid and/or to the projected contour (ideal location) of the T-shirt. Since the markers 1102 are at a predetermined spacing on the fabric web 902, a deformation in the Y direction caused by a wrinkle or deformation in the material web 902 can be detected by viewing the spacing between the markers 1202 as seen by the cameras 916 and as compared against the grid 1010. In alternative embodiments, the count of the number of markers 1202 that fit within the perimeters of projected image of the T-shirt in the Y or X direction may be used to detect a wrinkle in the fabric. In alternative embodiment, the count of the number of markers 1202 that fit within the X or Y dimension of the projected contour of the T-shirt may be used to determine a condition of over stretching of the fabric because a relaxed fabric would have a predetermined number of markers 1202 that fit within the boundaries of the projected T-shirt. However, in the case of an overly stretched fabric, fewer markers 1202 would fit within the same boundaries of the projected T-shirt. In yet another embodiment, the spacing between each adjacent marker or a group of markers 1202 as compared to the projected grid 1010 may be used to detect a wrinkle in the fabric which would shorten the spacing between markers or an overstretched fabric which would further distance the spacing between markers. The increase or decrease in the spacing between markers can be viewed and analyzed using the camera 916 when compared against the projected grid 1010. In alternative embodiments, the position or orientation of an actual article or the fabric web 902 may be distorted due to wrinkles or excessive stretching, and these visual effects of the distortions can be visualized and/or detected when comparing the projected grid and/or the projected object (in this case the T-shirt) to the actual location of the contours of a T-shirt or the borders of a web of fabric. The comparison allows for the identification of a problem such as a wrinkle, an over stretched fabric and the early detection or prevention of a defective article.

The predetermined anticipated width of an undeformed fabric 902 in the X direction can be determined and compared with the grid, wherein a predetermined number of grid lines is anticipated between the left and right edges of the fabric 902. If there are the expected predetermined number of grid lines between the left and right edges of the fabric 902, then it can be determined that there is little or no deformation of the fabric 902 in the X direction. However, if there is a deviation such as a wrinkle or twist in the fabric in an X direction, the distance between the left and right edges of the fabric 902 will not include the anticipated number of grid lines. For example, if there are less than the expected number of grid lines between the left and write edges, it can be determined that there is some form of deformation in the X direction.

Similarly, a defect or deformation of the fabric 902 in the Y direction can be detected by comparing the markers 1006 with the grid 1010. If the fabric is not deformed in the Y direction, there would be a predetermined, expected number of grid lines between the markers 1006. If there are less than the expected number of grid lines between a pair of markers 1006, it can be determined that there may be a wrinkle or other deformation in the fabric 902. On the other hand, if there are more than the expected number of grid lines between a pair of markers 1006, it can be determined that the fabric has been unacceptably stretched. Not only can this method determine that there is a deformation but can also identify the location of the deformation by determining which markers 1006 do not have the expected number of grid lines between them.

It may also be the case that a defect such as a wrinkle in a fabric can extend in a Z direction out of the plane of the plane in FIG. 10 (not shown). In this case, there would be a deviation in both the X and Y directions. Such a deformation can be detected by comparing the grid with the width of the fabric 902 and the spacing between markers 1006 as described above.

Figure 13:
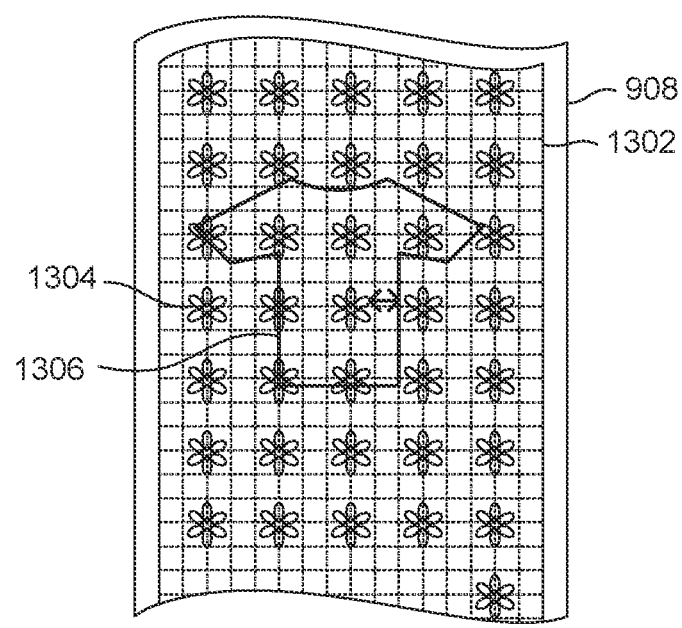

Yet another situation in which the above-described computer inspection system 900 can be invaluable is when fabricating an item from a fabric or material having one or more previously formed patterns. Such patterns can be formed, for example, by printing, embroidery, etc. In many cases there may be a need for aligning certain features of a manufactured item with certain features of a pattern. An example of such an implementation is illustrated with reference to FIG. 13. FIG. 13 shows a fabric or other material 1302 having a pattern 1304 formed, thereon. FIG. 13 also shows a projection 1306 of an article to be manufactured. There may be many situations where the location of the pattern relative to the manufactured article is critical. For example, it may be desirable for a certain portion of the pattern to align with an edge of a fabric panel so that when that fabric panel is joined (e.g. by forming a seam) with another panel of fabric, the patterns of both panels match up to form an esthetically pleasing finished product. This would be the case for fabrics that have directional patterns that are printed on them or have inherent patterns within the fabric type, such as corduroy fabric. Detection and matching of such a pattern by tactile or physical means may be very difficult by an automated system. However, in some embodiments, the computer inspection system can be operable to compare the location and/or orientation of the projection with location or orientation of the fabric pattern as viewed by the cameras of the computer inspection system 900 to confirm alignment or lack thereof between the fabric pattern location and orientation and the projection of the ideal location and orientation as compared to the computer inspection system 900 grid projection and/or article projection. If the patent and projection do not line up as desired, the control system can compensate by moving the projection and intended location of the manufacturing process (e.g. cutting, seam formation, adhesive dispensing, etc.) until they do match up as desired. In some embodiments, the computer vision system 900 may use the projection of the article and the projected grids to verify the proper placement and orientation of the article. Furthermore, the computer vision system 900 may also be used to inspect, verify, and confirm that any manufacturing operations such as cutting of the fabric, deposition of adhesive or sewing is done along the proper direction, track and orientation. In each of the previous examples, the computer vision system 900 provides an additional multilayered verification and inspection system that detects problems and either tag defects or prevents them by providing the necessary feedback to correct any mistakes before the error has caused an irreversible defect.

In another embodiment, a computer inspection system 900 can be implemented in an environment in which a workpiece such as a fabric, upholstery, etc. has a feature such as a pattern or texture that runs in a linear or bi-linear direction that needs to be arranged at a desired angle relative to a pattern to be formed. For example, many fabrics, such as corduroy, seersucker (railroad stripes), etc. have fabric elements such as texture that are oriented as parallel features running in a Y direction or an X/Y direction. This would also apply to fabrics such as herringbone, pinstripe, plaid, etc. Similar uses could also apply to a situation wherein a striped pattern is printed on or woven into the fabric web 1402.

Figure 14:
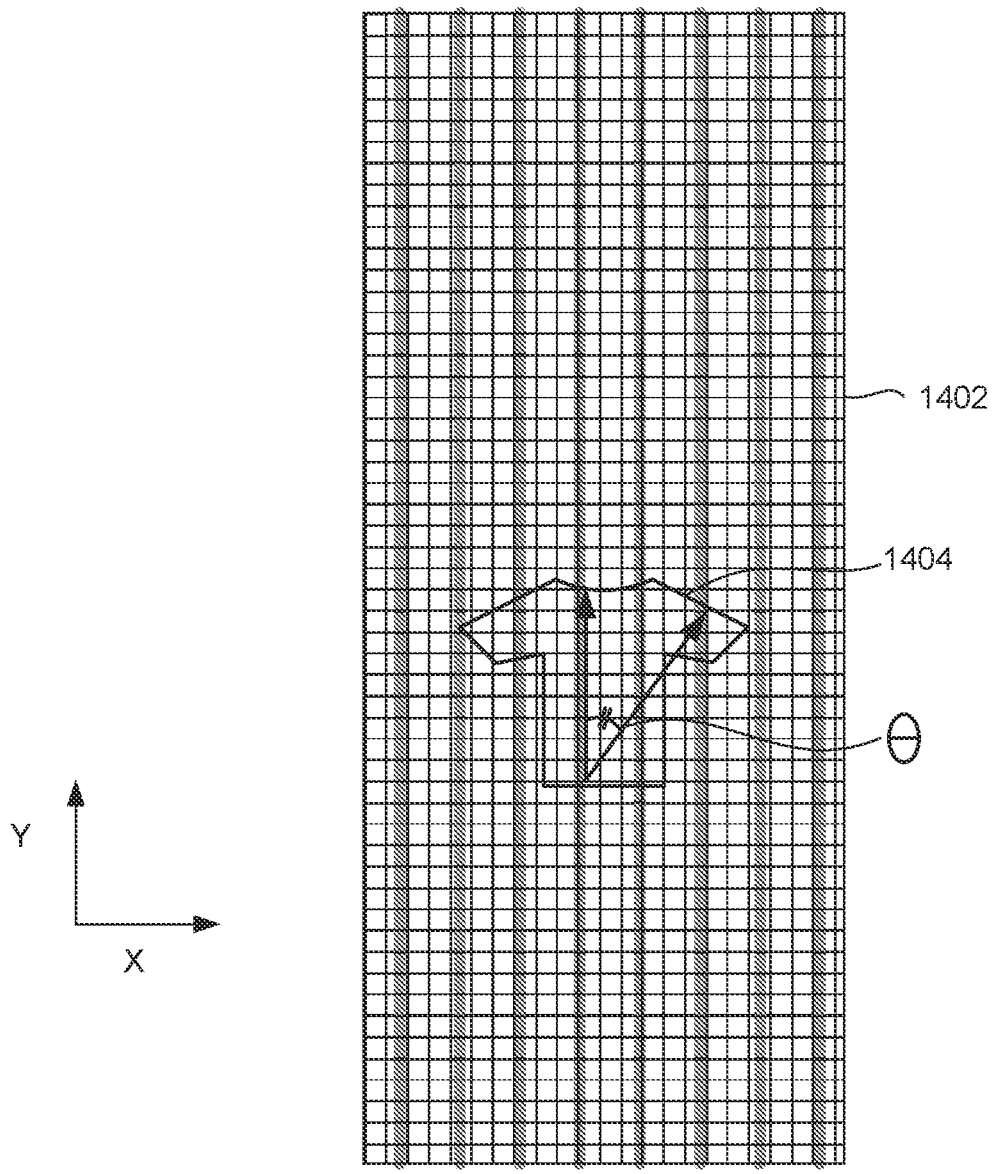

FIG. 14 shows a material such as fabric 1402 having some feature that is oriented in a Y direction. This feature could be a physical feature of the fabric itself, such as in the case of corduroy, pinstripe, seersucker, herringbone etc. A projection 1404 of an item to be manufactured is projected onto the fabric 1402. As with the previous examples, the projection 1404 indicates the location at which some manufacturing process will be performed such as cutting, seam formation, application of adhesive, etc. In certain situations, it may be desirable to orientate the manufactured item so that one or more features of the item are aligned with a direction of the fabric feature such as in the Y or X/Y direction. In one embodiment, the projection 1404 of the item to be processed is projected onto the fabric 1402. Using the computer vision system, the angle Θ between a feature of the projection (e.g. an edge of the projection) and the direction of the fabric feature is determined. If the angle Θ falls within an acceptable range (e.g. close to zero), then the arrangement of the projection is acceptable and the manufacturing process can proceed. If the angle Θ falls outside of the acceptable range (e.g. the projection is twisted or rotated), the manufacturing instruction from the control system 910 (not shown) can be modified until the projection and associated manufacturing process are changed to face the acceptable orientation. In some embodiments, a projected grid and/or the projection of the article may also be used to confirm or determine the angle Θ.

Figure 15:
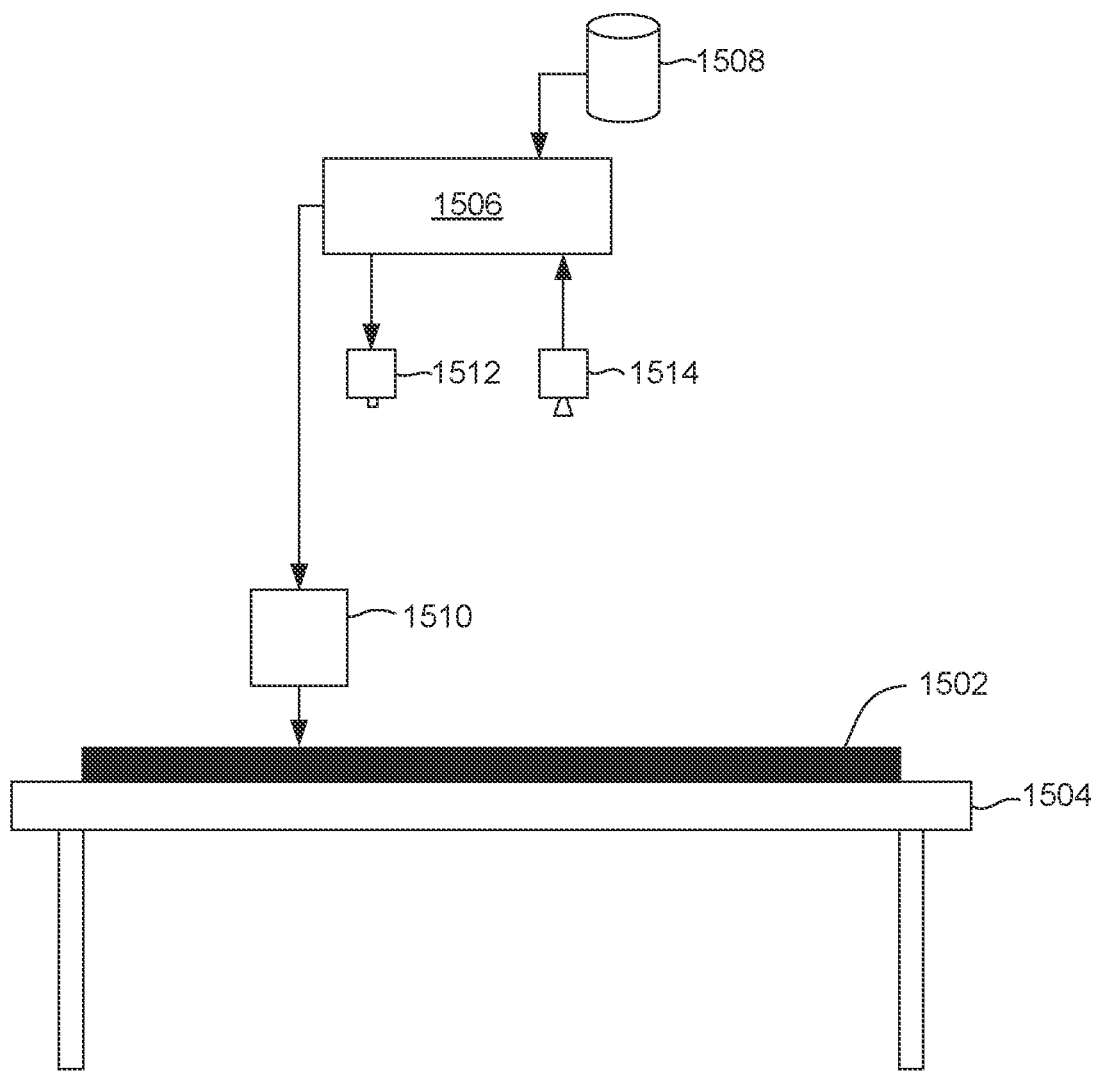
FIG. 15 is a side schematic view illustrating the use of computer inspection measurement validation in a manufacturing environment according to an alternate embodiment.

The above implementations and embodiments have been described in terms of a garment manufacturing system and more particularly, to a garment manufacturing system that performs manufacturing operations on a web of fabric traveling on or without a conveyor belt. However, this has been by way of example, and the use of computer inspection system 900 is not limited to continuously moving operation environment such as the manufacture of garments or related items on a mobile conveyance system. In some embodiments the computer inspection system 900 may be used in a stationary environment where each article or fabric web is stationary on a platform such as a stationary table. Similarly, in some embodiments, the computer inspection system 900 may be applicable to multiple layers of fabric lying flat on a work environment. FIG. 15 shows a workpiece 1502 arranged on a workstation 1504. In one embodiment, the workstation can be a table on which one or more manufacturing operations are performed on the workpiece 1502. In one embodiment, the workpiece can include one or more layers of flexible material such as fabric, upholstery, leather, etc. In the embodiment shown in FIG. 15, the workpiece is shown as being many layers of fabric, upholstery, etc. A control system 1506 can receive manufacturing data 1508 which can be externally stored data and/or which can be stored in memory within the control system 1506. The data 1508 can be in the form of Computer Assisted Design (CAD) data, Computer Numerical Control (CNC) data or some other type of data. The control system can be configured to deliver manufacturing instructions to tooling 1510 to instruct the tooling in performing one or more manufacturing processes on the workpiece 1502. These manufacturing instructions can include one or more of cutting, seam formation, applying adhesives welding folding, bending, etc., depending upon the item to be manufactured. The control system 1506 can be functional to send projection data to one or more projectors 1512 to allow the projectors to display a projection onto the workpiece 1502, wherein the projection corresponds to one or more features of the manufacturing process to be performed on the workpiece 1502. The projectors 1512 can be laser projectors, non-laser projectors, still frame projectors, video projectors, etc. The data projection data sent to the one or more projectors can be directly or indirectly derived from the manufacturing data 1508 such as CAD data, CNC data, etc.

With continued reference to FIG. 15, the control center 1506 can be operable to receive data from one or more cameras 1514 to receive and process visual data related to the workpiece 1502 and the projection displayed on the workpiece 1502. The control system can include logic and or circuitry that can be functional to interpret the image or images from the camera related to the workpiece 1502 and the projection on the workpiece to determine if the manufacturing data to be sent to the tooling 1510 is accurate as is or needs to be modified in some way to meet desired parameters.

Figure 16:
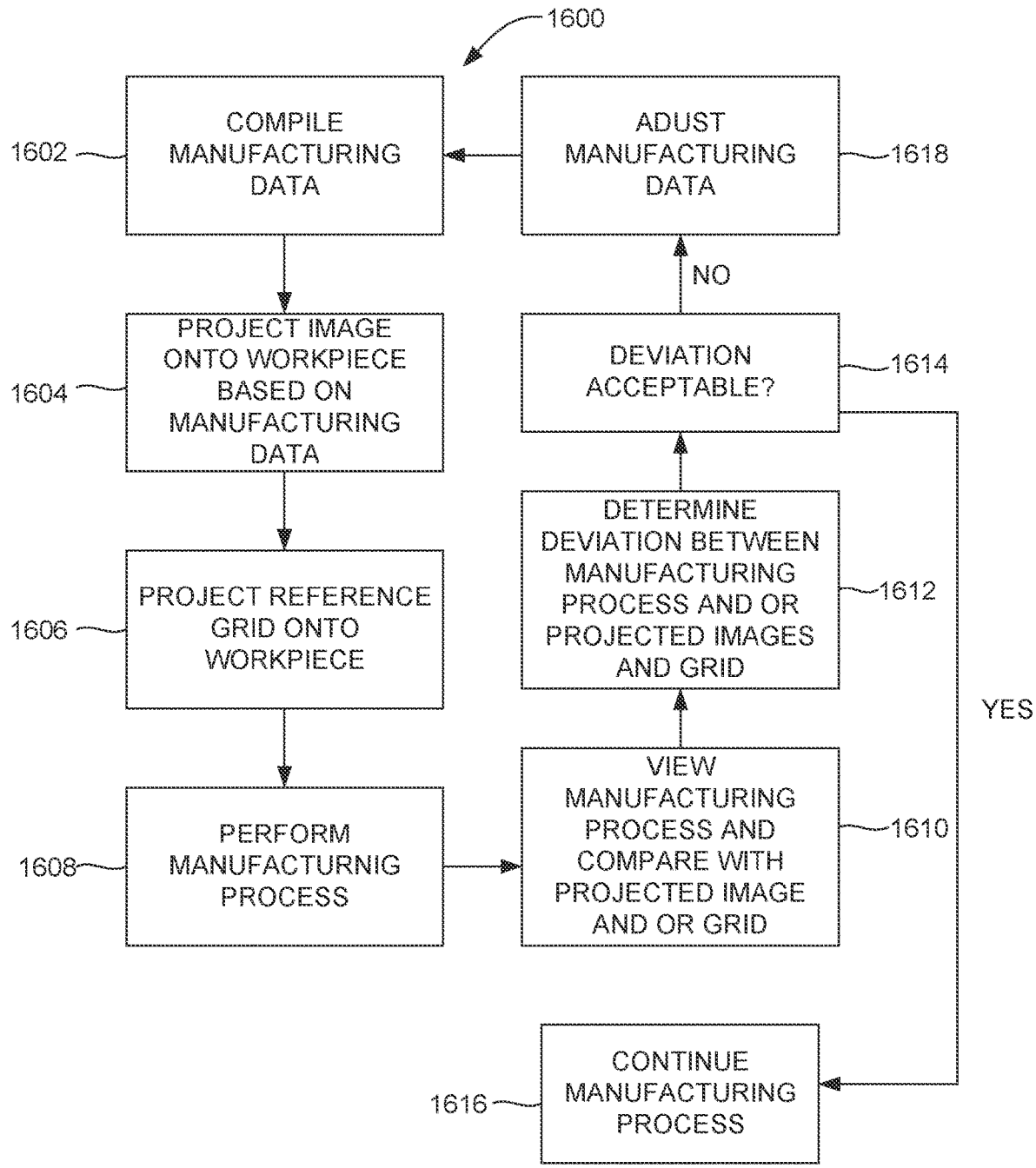
FIG. 16 is a schematic flowchart illustrating a method for implementing computer inspection measurement validation according to an alternate embodiment.

FIG. 16 is a schematic flowchart illustrating a method 1600 for manufacturing an item, wherein the manufacturing is aided by computer vision. The method can begin with the retrieving or compiling of manufacturing data in operation 1602. This manufacturing data can be compiled in a control system and may be stored in computer readable memory internal or external to the control system. An image is projected onto a workpiece in operation 1604. The image can be based on the manufacturing data. In addition, a reference feature such as a grid pattern can be projected onto the workpiece in operation 1606. In one embodiment the workpiece can be a web of material such as fabric. In one embodiment, the workpiece can be a continuous web of fabric which can be fed from a bolt or roll. In one embodiment, the web of fabric can be fed in a stepwise manner to stop at preselected locations to allow manufacturing processes to be performed thereon. A manufacturing process can then be performed in operation 1608. The manufacturing process can be based on the compiled manufacturing data. The manufacturing process is viewed and compared with the projected image and grid in operation 1610. A determination is made as to whether there is a deviation between the manufacturing process being performed and the projected images in operation 1612. In one embodiment, the projected image is compared against the projected grid pattern to determine an error or deviation from a desirable manufacturing process. In one embodiment, this can include determining whether there is a deviation or deformation such as a wrinkle or over stretching in the workpiece/fabric. This comparison can be performed either prior to performing the manufacturing process or during the manufacturing process. A determination is then made as to whether the deviation, if any, is within acceptable limits in operation 1614. If the deviation, if any, is within acceptable limits the manufacturing process is continued in operation 1616. If the deviation is outside of acceptable limits the manufacturing process can be temporarily halted and the manufacturing can be adjusted accordingly in operation 1618. In alternative embodiments, the determination of a deviation may cause the system to flag the article subject to the excessive deviation for further inspection or rejection as a defective article.

Figure 17:
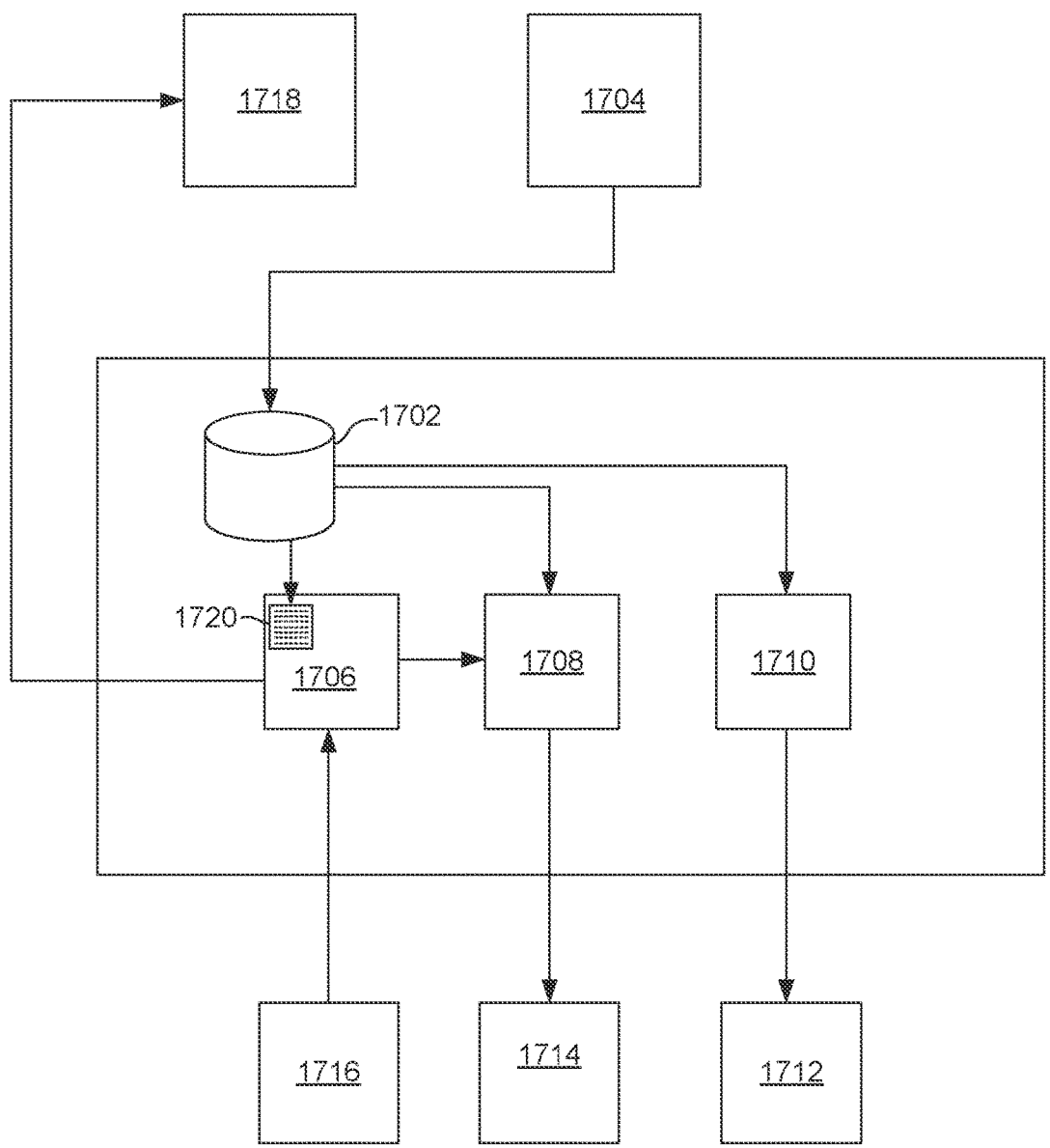
FIG. 17 is a schematic illustration of a control system according to an embodiment.

FIG. 17 is a schematic view illustrating a control system according to an embodiment. The control system can include memory 1702 for receiving and storing manufacturing data 1704. The manufacturing data can be in the form of Computer Aided Design (CAD) data, Computer Numerical Control (CNC) data or some other type of data related to a process to be performed by tooling. The control system 910 can also include an image processing module 1706, a tooling control module 1708 and a projection control module 1710.

The projection control module includes circuitry and/or computer readable instructions that are to retrieve manufacturing data from the memory 1702 and generate projection data related to a process to be performed on a workpiece which can be a flexible, pliable workpiece such as fabric, leather upholstery, etc. The projection control module can also be functional to send the projection data to one or more projectors.

The tooling control module 1708 includes circuitry and/or computer readable instructions for retrieving manufacturing data from the memory 1702 and using that data to generate one or more tooling instructions for performing a desired operation on a workpiece. In one embodiment, the projection data and tooling instructions are related to the workpiece. The tooling control module can be functional to send the tooling instructions to one or more tooling devices 1714.

The image processing module 1706 includes circuitry and/or computer readable instructions functional to receive image or video data from one or more cameras, spectrometers etc. 1716. The image processing module 1706 also includes circuitry and or computer readable instructions for processing and/or analyzing the data from the camera, spectrometer etc. 1716 and determine any possible errors with regard to the manufacturing process to be performed. If such errors are flagged, in one embodiment the image processing module may be functional to determine corrective actions and to send such corrective actions to the tooling control module 1708. In another embodiment, the image processing module 1706 may be functional to send notification of such errors and possible corrective action to an external device or operator 1718. In a possible embodiment, the image processing module 1706 may reference an index 1720 of possible manufacturing errors of concern related to the manufacturing process to be performed. The index 1720 may include items such as, detecting deformation of the workpiece, misalignment of the manufacturing process with a feature of the workpiece, an oversize condition of the manufacturing process to be performed, etc. In one embodiment, the index may be compiled by data retrieved from the memory 1702.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments but should be defined only in accordance with the following claims and their equivalents.

What is claimed is:

1. A system for manufacturing apparel, the system comprising:
    a structure for dispensing a continuous web of fabric across a workstation;
    tooling for performing one or more processes on the continuous web of fabric;
    at least one projector configured to project an image onto the continuous web of fabric;
    at least one camera configured to view at least a portion of the continuous web of fabric; and
    a control system functional to:
        receive manufacturing data and to deliver manufacturing instructions to the tooling;
        deliver projection data to the camera, the projection data including data for projecting onto the web of fabric an image related to an article of manufacture and an image of a reference grid;
        receive data from the camera, the data including data regarding the projected image as compared to the article of manufacture and the projected image of the grid;
        analyze the data received from the camera to determine a deviation error related to the one or more processes to be performed on the continuous web of fabric.

2. The system as in claim 1, wherein the continuous web of fabric is suspended between a dispensing roll of fabric and a retrieving roll of fabric.

3. The system as in claim 1, wherein the continuous web of fabric is supported by a conveyor belt.

4. The system as in claim 1, further comprising a plurality of projectors, wherein one projector projects an image related to the article of manufacture and another projector projects the image of the grid.

5. The system as in claim 1, wherein the web of continuous fabric includes one or more of cloth, upholstery, leather and felt.

6. The system as in claim 1 further comprising a plurality of cameras configured to view the continuous web of fabric from multiple angles.

7. The system as in claim 1, wherein the control system is functional to analyze data from the at least one camera to detect a deformation of the continuous web of fabric by comparing the fabric with the projected grid.

8. The system as in claim 1, wherein the control system is functional to determine a deviation in the process to be performed on the continuous web of fabric by comparing the projection related to the article of manufacture with the projection of the grid and/or the projection of the article from the data received from the at least one camera.

9. The system as in claim 1, wherein the control system is functional to verify an accurate placement of an item on a finished article of manufacture by comparing a view of the item with the projection of the grid from data received by the at least one camera.

10. The system as in claim 1, wherein the control system is functional to verify an accurate placement of an item on an article of manufacture by comparing an image of the item with the projection of the article of manufacture and/or the projection of the grid from data received from the at least one camera.

11. A control system for implementing an apparel manufacturing process, the control system comprising:
a module for delivering manufacturing instructions to tooling for performing operations on a continuous web of fabric;
a module for delivering data to at least one projector for displaying onto the continuous web of fabric a first image related to a workpiece and a second image being reference grid;
a module for receiving data from a camera, wherein the data includes data related to the projected first and second images; and
a module for analyzing the data from the camera to detect a deviation in the operation to be performed by comparing a view of the continuous web of fabric with a view of one or more of the grid and the image.

12. The control system as in claim 11, wherein the module for analyzing the data from the camera is further configured to compare one or more reference points of the continuous web of fabric with a predetermined expected number of grid lines.

13. The control system as in claim 11, wherein the module for analyzing data from the camera receives and analyzes data from a plurality of cameras.

14. The control system as in claim 11, wherein the module for delivering data to at least one projector is configured to deliver data to a plurality of projectors, wherein one of the plurality of projectors is configured to display the first image and another of the plurality of projectors is configured to display the second image.

15. The control system as in claim 11, wherein the module for analyzing data from the camera is configured to verify proper placement of an item attached to a finished workpiece.

16. A method for validating the manufacture of garments manufactured on a continuous web of fabric, the method comprising:
projecting onto the continuous web of fabric at least one of a first image related to an article of manufacture and a second image related to a reference grid;
selecting a manufacturing process to be performed on the continuous web of fabric;
capturing by a camera at least one image of a step in the garment manufacturing process;
using the computer enabled control system identify a detecting a manufacturing process deviation by comparing the at least one captured image of the manufacturing process as compared against at least one of the first and second projected image.

17. The method as in claim 16, further comprising: detecting a deformation in the continuous web of fabric.

18. The method of claim 17, wherein the deformation is one of wrinkles or an over-stretching of the web of fabric.

19. The method of claim 18 further comprising including visual markers along the fabric web and wherein the detection of the deformation is based on comparing of a calculated distance between adjacent markers and the ideal distance between markers.

20. The method as in claim 17 further comprising detecting a location of deformation based on the distance between markers on the continuous web of fabric.

21. The method of claim 20 wherein the markers are printed on the fabric.

22. The method of claim 21 wherein the markers are printed in ink that is only visible outside the visible light frequencies.

23. The method of claim 19 wherein the markers are one of: a hole or an indentation.

24. The method of claim 16 wherein the determination of a deformation in the continuous web of fabric is made based on comparing a captured image of a count of a number of markers included within a perimeter of a first image and/or within a second image.

25. The method of claim 20 further comprising:
calculating the spacing between adjacent markers as captured by a camera by comparing the spacing between adjacent markers to the second image;
comparing the calculated adjacent marker spacing to the ideal spacing;
detecting the presence of a wrinkle if the spacing between adjacent markers is smaller than the ideal spacing;
detecting the presence of an overstretching of the web of fabric if the spacing between adjacent markers is greater than the ideal spacing; and
detecting the lack of an overstretching of the web of fabric or a wrinkle if the spacing between adjacent markers is equal to the ideal spacing.

26. The method as in claim 16, sending operating instructions to tooling to perform one or more manufacturing operations on the continuous web of fabric, and altering the instructions based on the analysis of the data.

27. The method as in claim 16, wherein the projection of the first image is determined from data relating to the manufacturing process to be performed.

* * * * *